United States Patent [19]
Tapphorn et al.

[11] Patent Number: 6,074,135
[45] Date of Patent: Jun. 13, 2000

[54] COATING OR ABLATION APPLICATOR WITH DEBRIS RECOVERY ATTACHMENT

[75] Inventors: Ralph M. Tapphorn, Las Cruces, N. Mex.; Howard Gabel, Menlo Park, Calif.

[73] Assignee: Innovative Technologies, Inc., Santa Barbara, Calif.

[21] Appl. No.: 09/130,803

[22] Filed: Aug. 7, 1998

Related U.S. Application Data

[63] Continuation of application No. 08/719,740, Sep. 25, 1996, Pat. No. 5,795,626.

[51] Int. Cl.[7] .................................................. B65G 53/00
[52] U.S. Cl. ................................. 406/46; 406/55; 406/77; 406/79; 406/134; 406/136
[58] Field of Search .................................. 406/134, 136, 406/46, 135, 55, 77, 79

[56] References Cited

U.S. PATENT DOCUMENTS

| | | | |
|---|---|---|---|
| 3,549,206 | 12/1970 | Reuter | 406/134 |
| 4,548,529 | 10/1985 | van der Burgt | 406/77 |
| 5,405,219 | 4/1995 | Wang | 406/146 |
| 5,462,351 | 10/1995 | Royal | 406/137 |

FOREIGN PATENT DOCUMENTS

| 0026724 | 2/1983 | Japan | 406/136 |
|---|---|---|---|

*Primary Examiner*—Christopher P. Ellis
*Assistant Examiner*—Kenneth W Bower
*Attorney, Agent, or Firm*—Morrison & Foerster LLP

[57] ABSTRACT

An environmentally compliant triboelectric applicator and process for coating or ablating a substrate and for retrieving excess or ejected material from the substrate. The applicator comprises an inner supersonic nozzle for accelerating triboelectrically charged projectile particles entrained in a supersonic gas to speeds sufficiently high to coat or ablate a substrate. The applicator further comprises an outer evacuator nozzle coaxially surrounding the inner supersonic nozzle for retrieving excess projectile particles, ablated substrate powders, or other environmentally hazardous materials. A fluid dynamic coupling uses the efficacy of the Mach turning angle associated with a supersonic boundary layer of carrier gas to aspirate the central core of the supersonic two-phase jet. This fluid coupling and spacing between the outlet of the supersonic nozzle and the substrate also permits the substrate to triboelectrically charge to levels which induce electrostatic discharges at the substrate simultaneous to the impacts. The aspiration feature reduces the outlet pressure in the central core of the nozzle below ambient pressure which allows the projectiles to travel unimpeded to the substrate, and reduces the inlet pressure required to achieve parallel and shock-free flow with the inner supersonic nozzle. The powders are injected into the carrier gas using powder feeders modified for high pressure and the ablated debris with excess projectile particles are collected in a particle precipitator and filter unit using a suction blower. A special nozzle applicator embodiment and process for coating or ablating the internal surface of a cylinder bore is also disclosed. This nozzle applicator comprises an axisymmetric cylindrical nozzle for conveying, accelerating, and triboelectrically charging projectile particles entrained in a carrier gas to speeds sufficiently high to coat or ablate the internal surface of the cylinder bore substrate when impacted by a triboelectrically charged jet comprising a central core.

23 Claims, 10 Drawing Sheets

COATING OR ABLATION APPLICATOR WITH DEBRIS RECOVERY ATTACHMENT

CROSS-REFERENCE TO RELATED APPLICATION

This application claims priority to the U.S. patent application entitled COATING OR ABLATION APPLICATOR WITH DEBRIS RECOVERY ATTACHMENT, Ser. No. 08/719,740, filed Sep. 25, 1996, now U.S. Pat. No. 5,795,626, and invented by Howard S. Gabel and Ralph M. Tapphorn.

BACKGROUND OF THE INVENTION

1. Field of the Invention

The present invention is directed to an environmentally compliant applicator which uses a supersonic nozzle to convey high-speed triboelectrically charged particles to a substrate for effecting a coating or ablating the substrate. The supersonic nozzle of the applicator gun is fluid dynamically coupled to the substrate and the evacuator nozzle to enhance the triboelectric charging, reduce the inlet gas pressure required for supersonic expansion, and retrieve the excess particles. The impact energies achieved by accelerating small triboelectrically-charged projectile particles (i.e. <100 microns in diameter) to speeds in excess of several hundred meters per second coupled with the electrostatic discharge energy provides an interaction energy that is significantly greater than that which can be attained in the art. Furthermore, the present invention is directed to a method for enhancing the melting and annealing of the substrate (e.g. to reduce residual stress) by triboelectric discharges which occur as a result of charge buildup on the substrate as triboelectrically charged particles impact the substrate.

The coating process or ablation process is determined by the material properties of the powder particles and substrate, and the energy densities deposited via the collisional energy and the triboelectric discharge energy at the impact zone. For producing metallized or polymerized coatings, the powder particles must be ductile or must have a sufficiently low glass transition temperature, and must adhere to the substrate for a sufficient duration to allow the binding energy between the particle and the substrate to establish a good bond.

The ablation process occurs with powder particles which have sufficient hardness and high melting point to preclude adhesion upon contact with the substrate. The ablation mechanism consists of erosion, melting, or evaporation of the uppermost substrate layer as determined by the speed of the particle, the triboelectric discharge energy, and the substrate material properties. The salient advantage of this invention over the art is the ablation efficiency provided by the high impact pressure of smaller diameter particles coupled with the triboelectric discharge energy.

2. Description of Related Art

Several references disclose methods of coating substrates by conveying powder particles in a carrier gas at high velocities and impacting the substrate to form the coating. Many of these references disclose use of high temperature carrier gases that melt the powder particles. U.S. Pat. No. 5,340,615 to Browning and U.S. Pat. No. 5,330,798 to Browning are exemplary of these high temperature methods.

Recently, U.S. Pat. No. 5,302,414 to Alkhimov, et al., discloses a low temperature method for coating substrates with metals, alloys, polymers, or mechanical mixtures of a metal and alloy by conveying powder particles at high speeds in a supersonic jet that is directed at a substrate to be coated.

Applications of the high temperature coating references are limited to depositions onto substrates which do not melt, burn, corrode, oxidize, or otherwise degrade in the high temperature environment of the carrier gas as it impinges on the substrate. Recently, U.S. Pat. No. 5,271,965 to Browning disclosed a method of injecting the particles at various locations in the expanding jet of the carrier gas so as to control the amount of particle melting prior to impact. The U.S. Pat. No. 5,302,414 to Alkhimov, et al., discloses a method of forming the gas and particles into a supersonic jet having a temperature sufficiently low to prevent thermal softening of the first material and a particle velocity from about 300 to about 1,200 m/sec. Although this latter method enables the coating of substrates without degrading materials by melting, burning, or evaporation, it does not address the issue of the residual stresses introduced in the coating and substrate materials by the plastic deformation of the impact process.

U.S. Pat. No. 4,979,680 to Bauch, et al., discloses a spray gun with electrokinetic charging of powdered material for the purpose of electrostatically coating workpieces with a plastic powder coating. U.S. Pat. No. 3,757,079 to Blomgren, Sr., uses an electrostatic field with corona discharge in the vicinity of an electric arc to provide a distortion-free weld of high integrity, and U.S. Pat. No. 3,895,211 to Pentegov, discloses a circuit design for implementing an electrostatic field generator. Triboelectric charging of particles during coating and painting processes have been conventionally used to affect coatings, the dispersion of particles to render more uniform coatings, and to control the coating thickness.

All of the electrostatic coating references disclose use of electrostatic charging of particles as a means of affecting coatings through electrostatic attraction or repulsion, but none of these references disclose the use of electrostatic discharge as a means of adding energy to the coating so as to affect the melting or annealing of the coating deposition. Only U.S. Pat. No. 3,757,079 to Blomgren, Sr., demonstrates that an electrostatic field with corona discharge may affect the integrity of an arc weld, but does not teach any device or method for coating or ablating a substrate.

Many types of sandblasting devices for cleaning the surface of a substrate have been disclosed in various patents. The following list is exemplary of the types of patents issued in this class: U.S. Pat. No. 5,283,985 to Browning, U.S. Pat. No. 5,160,547 to Kirschner, U.S. Pat. No. 3,894,364 to Korn, et al., U.S. Pat. No. 3,753,318 to Eskijian, U.S. Pat. No. 3,895,465 to Korn, et al., and U.S. Pat. No. 3,916,568 to Rose, et al. Two patents, U.S. Pat. No. 5,203,794 to Stratford, et al. and U.S. Pat. No. 4,703,590 to Westergaard also disclose methods of using particles which sublimate after impingement on the substrate.

All of these references use relatively large projectile particles (i.e. in excess of 100 microns in diameter) at low velocities (i.e. less than 300 meters/second) to abrade the substrate surface. The low impact pressures (determined by density of particle times velocity squared) attained by these methods abrade the substrate by an impact deformation process which fractures the brittle or work-hardened substrate surface. This abrasion process precludes the possibility of ablating the uppermost layer of many substrates by melting or evaporation, because the impact energies are too low.

In addition, several patents; U.S. Pat. No. 3,788,010 to Goff, U.S. Pat. No. 4,646,482 to Chitjian, U.S. Pat. No. 5,035,089 to Tillman, et al., U.S. Pat. No. 4,132,039 to Gilbert, et al., U.S. Pat. No. 3,894,851 to Gorman, U.S. Pat. No. 3,916,568 to Rose, et al., U.S. Pat. No. 5,197,160 to Smith A. L., U.S. Pat. No. 5,205,085 to Urakami, Fukashi, U.S. Pat. No. 5,256,201 to Gelain, et al., U.S. Pat. No. 5,263,897 to Kondo, et al., U.S. Pat. No. 5,269,949 Tuszko, et al., and U.S. Pat. No. 5,273,647 Tuszko, et al., disclose methods for recovering the excess blasting particles, retrieving, and filtering the abraded material. Although these devices have been effectively used with both subsonic and supersonic sandblasting nozzles, these references do not claim any special fluid dynamic coupling between the ejection nozzle and the recovery nozzle which maintains the supersonic two-phase flow within the supersonic nozzle nor do they disclose the use of a triboelectrical discharge as a means for affecting the coating or ablating process during the substrate impact.

SUMMARY OF THE INVENTION

The present invention discloses an environmentally compliant applicator and process, for coating or ablating a substrate and for retrieving excess or ejected material from the substrate. The present invention comprises an application nozzle comprising an inner supersonic nozzle for conveying, accelerating, and triboelectrically charging projectile particles entrained in a supersonic gas to speeds sufficiently high to coat or ablate the uppermost surface of a substrate when impacted by the two-phase jet. The salient feature of the invention over the art is an applicator that provides the means of accelerating-projectile particles to supersonic speeds combined with the triboelectric charging of the powder particles. The triboelectric charging is induced by rubbing the projectile particles on the sidewalls of the supersonic nozzle and by rubbing the projectile particles against each other in the confined throat of the nozzle. In other embodiments of the invention, the triboelectric charging is supplemented by applying a charging voltage source to electrostatic electrode pads installed on the inner walls of the inner supersonic nozzle that enhances the charging of the projectile particles.

The coating process or ablation process is determined by the material properties of the powder particles and substrate, and the amount of energy deposited via the collisional energy and the triboelectric discharge energy at the substrate. For producing metallized or polymerized coatings, the powder particles must be plastically ductile, or must have a sufficiently low glass transition temperature, and must adhere to the substrate for a sufficient duration to allow the binding energy between the particle and the substrate to establish a good bond. Conversion of the kinetic and triboelectric discharge energy to work associated with plastic deformation and heat provides the means of fusing particles to the substrate while building up a coating layer.

The ablation process occurs with powder particles which have a sufficient hardness and high melting point to preclude adhesion upon contact with the substrate. The ablation process consists of erosion, melting, or evaporation of the uppermost substrate layer as determined by the speed of the particle, the triboelectric discharge energy, and the substrate material properties.

The interaction energies involved in the impact process consist of the kinetic energy of the particle plus the triboelectric discharge energy induced at the substrate. The power densities provide by the kinetic energy impact process are easily estimated from the interaction energies as outlined below.

For a 7.0 micron diameter zinc particle traveling at 750 m/s, the kinetic energy ($\frac{1}{2}*m*v^2$) per particle is approximately $3.6 \times 10^{-7}$ Joules/particle. A 3.0 micron diameter nickel particle accelerated to a speed of 1300 m/s has a kinetic energy of $1.06 \times 10^{-7}$ Joules/particle, while a 12.0 micron tungsten particle accelerated to a velocity of 1000 m/s has a kinetic energy of $8.7 \times 10^{-6}$ Joules/particle. Considering that most of these powders can be sprayed at 0.45–4.5 kilograms/hour (1–10 lbs per hour) with the applicator of this invention, the power densities provided by the kinetic energy impact process is on the order of 10–200 megawatts per square meter ($10-200 \times 10^6$ Watts/m$^2$). This is comparable to the energy densities provided by many LASERS currently used in the LASER ablation, coating, and cutting processes.

The triboelectric discharge energy is determined by the amount of charge deposited with each particle and the level of charge that can be sustained or built up on the substrate. Electrostatic theory teaches (e.g. Bylthe A. R. and Reddish W. "Charges on Powders and Bulking Effects", *Electrostatics* 1979, *Conference on Electrostatic Phenomena 5th*, St. Catherine's College, Oxford, England, The Institute of Physics, Bristol and London, 1979, pp. 107–114) that the maximum charge on a particle can be estimated from the electric field strength required to induce dielectric breakdown (approximately 3 million volts per meter in air) of the gaseous environment surrounding the charged particle. This gives a surface charge density of approximately 26 microcoulomb per square meter. Thus, the maximum charge that can be acquired on a 7.0 micron diameter zinc particle in a supersonic air stream is approximately 4 femtocoulombs ($4.0 \times 10^{-15}$ Coulombs). If all of this charge is accelerated through a potential of 1,000 volts, the maximum triboelectric discharge energy that can be added to the substrate is $4.0 \times 10^{-12}$ Joules. While the triboelectric discharge energy per particle is quite small, the charge on the substrate region within the impingement zone of the jet (approximately $5.0 \times 10^{-6}$ square meters for one embodiment of this invention) can reach 130 picocoulombs ($130.0 \times 10^{-12}$ Coulombs). If this amount of charge is accelerated through a 1,000 volt triboelectric discharge potential, the resulting energy generated is $1.3 \times 10^{-7}$ Joules. Assuming most of this energy is deposited locally as heat on the substrate, it is comparable to the enthalpy required to melt a single zinc powder particle ($3.4 \times 10^{-7}$ Joules/particle).

The stream of triboelectrically charged powder particles continually replenishes charging of the substrate with repeat discharges occurring during the deposition process. Discharges associated with the electrostatic deposition of films have been observed by others (e.g. Sampuran-Singh J. F. Hughes and Bright A. W., "Discharges in Electrostatically Deposited Films", *Electrostatics* 1979, *Conference on Electrostatic Phenomena 5th*, St. Catherine's College, Oxford, England, The Institute of Physics, Bristol and London, 1979, pp. 17–25). These authors measured discharge energies of $1-2 \times 10^{-7}$ Joules which is comparable to the energies of the present invention.

Similarly, for ablating materials such as a silicon substrate, the enthalpy of ablation can be obtained from the Si—Si binding energy that is 326.8 kJ/mole or 11,671.4 kJ/kg. Neglecting the kinetic energy associated with a SiC particle (3 micron dia.), the triboelectric charging required to deliver $1.3 \times 10^{-7}$ Joules to the substrate during a triboelectric discharge through 1,000 volts potential is 130 picocoulombs. Considering that this interaction energy is delivered locally to a portion of the substrate having a mass approximately equal to the mass of the impinging projectile particle, the triboelectric discharge energy equals approximately one-third of the binding energy of Si atoms in this local impact region of the substrate. Thus, combining the triboelectric discharge energy with the particle kinetic energy easily provides sufficient energy to ablate the Si substrate in this example.

The applicator also comprises an outer evacuator nozzle coaxially surrounding the inner supersonic nozzle for retrieving the excess projectile particles and the ablated substrate material. The outer evacuator nozzle is mechanically and fluidly dynamically coupled to the inner supersonic nozzle and the substrate that provides the means for entraining the excess projectile particles, the ablated substrate particles, and other physical and chemical forms liberated from the substrate material. This fluid dynamic coupling, which specifically uses the aspiration efficacy of the Mach turning angle, allows the central core of the supersonic two-phase jet to operate at exit pressures sufficiently below the ambient pressure so as to reduce the inlet carrier gas pressures required to maintain supersonic two-phase flow (shock-free) within the central core region of the inner supersonic nozzle.

In addition, the dynamic fluid coupling of the outer evacuator nozzle relative to the substrate also provides the means for suspending the application nozzle on an air bearing which allows the unit to glide smoothing over the substrate surface, while the influx of air through the air-bearing channel prevents environmentally hazardous materials from escaping into the air.

The inner supersonic nozzle comprises a nozzle optimized for two-phase flow of triboelectrically charged projectile particles entrained in a supersonic gas jet. The outlet expansion contour of the inner supersonic nozzle wall is designed and shaped to achieve approximate parallel flow of the two-phase mixture within the central core such that the projectile particles-speeds are sufficiently high to cause coating or ablation of the substrate when coupled with the triboolectric discharges. The material of construction for the supersonic nozzle is selected to induce and enhance triboelectric charging of the particles as they pass through the nozzle.

The projectile particles consist of a material designed for the particular application. If the applicator is used to produce a metallized coating, then metallic powder particles or mixtures of metallic and nonmetallic powder particles are selected to achieve the required coating. For example, to deposit metal coatings including aluminum, nickel, copper, or zinc on metallic, ceramic, or polymeric substrates, a particular metal powder of interest is selected for the projectile particles. If an alloy coating is required, then powder particles consisting of a mixture of metallic powders in proportion to the constituents of the alloy are selected. The simultaneous injection or alternate injection of various types of powder particles fed by a plurality of powder feeders is also disclosed in this invention as a method for creating functionally graded coatings. Overlap and interleaving of various layers to form a final coating with unique material and physical properties is achieved by oscillating the injection of two or more different types of powder particles. Nonmetallic coatings may also be deposited with the invention by using nonmetallic powders. Methods of creating various degrees of porosity adjacent to the substrate by controlling the types of projectile particles and the nozzle parameters is expected to enable the deposition of coating materials capable of enhancing and promoting bone growth or aiding in the implantation of biomedical devices.

For ablation, if the process involves evaporation of the uppermost substrate layer, then a projectile material (e.g. ceramic $Al_2O_3$, fused silica $SiO_2$ or carborundum SiC), having a sufficiently high vaporization temperature, high latent heat of vaporization, and mechanical hardness is selected and accelerated to a sufficiently high speed in the supersonic nozzle to induce substrate material evaporation when coupled with the triboelectric discharge energy. In other embodiments of this invention, the projectile powder or particle materials may be selected from metals, alloys, polymers, ceramics, or other chemical compounds. The impact speed of the projectile particle coupled with the triboelectric discharge energy determines the amount of stress and heat induced in the uppermost layer of the substrate which in turn determines the ablation mechanism. For simple impact erosion of a substrate oxide layer, the projectile particles could be selected as a metal, alloy, polymer or ceramic powder and accelerated to a speed sufficiently low to preclude impact adhesion, but still cause fracture ablation to occur with the simultaneous triboelectric discharge.

The projectile particles are introduced into the carrier gas stream of the inner supersonic nozzle using conventional powder feeders (similar to the powder feed units disclosed in e.g. U.S. Pat. No. 4,808,042 to Muehlberger, et al., U.S. Pat. No. 4,740,112 to Muehlberger, et al., U.S. Pat. No. 4,726,715 to Steen, et al., U.S. Pat. No. 4,561,808 to Spaulding, et al., or U.S. Pat. No. 3,565,296 to Brush, et al.) which have been modified for high pressure operation.

The carrier gas in the preferred embodiment of the invention is compressed air at approximately ambient temperature and inlet pressures sufficiently high to induce supersonic two-phase flow (shock-free) within the inner supersonic nozzle. In other embodiments of this invention, the carrier gas may consist of, but not be limited to nitrogen, argon, helium, hydrogen, oxygen, steam (water vapor), gases specifically selected to enhance triboelectric charging (e.g. sulfur hexaflouride), or mixtures thereof. The properties of the carrier gas selected for accelerating the projectile particles depend on drag coefficient, gas density and supersonic speeds, the triboelectric charging capability, as well as the chemical stability of the substrate surface after deposition or removal. In some applications, a chemically active carrier gas may be desirable to treat the surface of the substrate immediately following the deposition or removal process.

The length of the inner supersonic nozzle is dependent on the minimum length required to accelerate and triboelectrically charge a specific type and size of projectile particle in a selected carrier gas to the required speed and particle charge for coating or ablating. Thus, the inner supersonic nozzle of the present invention comprises a telescoping barrel having the capability of accommodating a change in the nozzle length, as well an providing the means to fluid dynamically couple the inner supersonic nozzle exit to the substrate. Other longitudinal and lateral adjustments of the inner supersonic nozzle coaxially mounted within the outer evacuator nozzle provide the means of adjusting the impingement angle of the two-phase jet on the substrate, and provide the means of changing the fluid dynamic coupling and electrostatic discharge gap between the inner supersonic nozzle exit and the substrate.

The materials of construction for the inner supersonic nozzle are selected to enhance the triboelectric charging of the powder particles and accommodate the high pressure carrier gas. These basic materials include metals, ceramics, polymers, and composites. In some embodiments, the nozzle is constructed with electrostatic electrode pads or coatings electrically connected via feedthroughs to the inner wall of the supersonic nozzle for inducing triboelectric charging by charge transfer or induction from a charging voltage source to the projectile particles. In still other embodiments of the present invention, a sacrificial ablative nozzle is used to deposit alloy coatings in combination with the primary powder particles.

The outer evacuator nozzle comprises a subsonic nozzle encapsulating the inner supersonic nozzle having a contour designed to fluid dynamically coupled with the inner supersonic nozzle, and to achieve the required fluid dynamic air bearing coupling between the exit of the outer evacuator nozzle and substrate. The influx of air through the air-bearing channel of the outer evacuator nozzle prevents environmentally hazardous materials from escaping into the air. The effluent from the inner supersonic nozzle and the influx of air through the air bearing channel of the outer evacuator nozzle provides the means for conveying the excess particles or ablated material from the substrate to a particle precipitating and filter unit. The particle filter unit in series with the effluent and gas stream is used for removing powder particles or environmentally hazardous materials prior to releasing or recompressing and recycling the air or gas mixture.

The outer evacuator nozzle is offset from the substrate by a set of adjustable spherical roller bearings (e.g. as disclosed by U.S. Pat. No. 4,203,177 to Kegg, et al.). The offset dimension of the outer evacuator nozzle is determined by the fluid dynamics required to achieve air-bearing coupling between the edges of the outer evacuator nozzle. This air bearing ensures a smooth gliding interface between the applicator nozzle and the substrate. In alternative embodiments of this invention, the outer evacuator nozzle is mounted in direct contact (sealed with a gasket or o-ring) with the substrate so as to prevent environmentally hazardous gases from escaping into the air or to capture excess particles or ablated substrate powder within the inert environment of the selected carrier gas.

The salient feature of this invention is the fluid dynamic coupling maintained between the inner supersonic nozzle, the outer evacuator nozzle, and the substrate which enables the acceleration of projectile particles to supersonic speeds, and the electrostatic discharge of the triboelectrically-charged substrate at the substrate. First, this coupling provides the means for attaching the application nozzle to the substrate by the generation of sub-ambient pressure created by the aspiration efficacy of the Mach turning angle associated with the supersonic flow at the substrate. Secondly, the fluid dynamic coupling insures the entrainment and evacuation of the carrier gas mixture, air, and ablated materials through the outer evacuator nozzle. Thirdly, the fluid coupling provided by the aspiration efficacy of the Mach turning angle at the exit of the inner supersonic nozzle also creates a sub-ambient pressure within the central core of the supersonic two-phase flow. Two-phase flow theory of supersonic nozzles teaches that this design also allows a lower inlet carrier gas pressure for the supersonic nozzle to achieve shock-free flow within a central core region for a given expansion area ratio. The lower inlet carrier gas pressure provides a lower cost for the compressed gas requirements and the associated pressure vessel certifications of the applicator. Finally, the fluid coupling between the supersonic nozzle outlet and the substrate provides the means of conveying the triboelectrically-charged projectile particles to the substrate.

The materials of construction for both the inner supersonic nozzle and the outer evacuator nozzle are lightweight metal, polymer or composite materials which provide for a light weight applicator with sufficient structural strength for a pressure vessel containment and mechanical use. The applicator nozzle for this invention can be used in any orientation because its fluid dynamic operation is not sensitive to gravitational forces. The applicator nozzle also consists of a trigger switch for operating the electromechanical valves which controls the two-phase flow of the supersonic nozzle.

The present invention is directed to an environmentally compliant applicator and process for coating and ablating substrates while retrieving excess powder particles or liberated material from a substrate. The applications for this applicator nozzle range from coating a variety of substrates with various powders to removing substrate material, oxides, and prior coatings. One application that is particularly enhanced over the art is the non-chemical methods of etching and milling substrates. Milling of Si wafers using the triboelectrically enhanced ablation process is particularly applicable to the semiconductor industry for producing thinned substrates with enhanced heat conduction to a heat sink. Deposition of metal and semiconductor films on semiconductor substrates after milling is an obvious extension of the duality of this invention for both ablation and coating applications.

The process of generating projectile particles by using a sacrificial ablative nozzles constructed from a group consisting of metallic materials, metallic alloy materials, non-metallic materials and mixtures thereof is an unique application of the this invention for creating alloyed coatings.

Generation of nanoscale particles from impact and triboelectric discharge evaporation of substrate bulk materials followed by heterogeneous nucleation of the vapors in the low-pressure zone of the two-phase flow jet is yet another application of the invention. Recovery of the powder and debris within a particle filter and classifier system as disclosed by U.S. Pat. No. 5,035,089 Tillman, et al., and U.S. Pat. No. 4,723,378 VanKuiken, Jr., et al. is also provided by the present invention.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is a side elevation view of the coating and ablation applicator with a debris recovery attachment showing the outer evacuator nozzle positioned in front of the substrate.

FIG. 2 is a top plan view of the coating and ablation applicator with a debris recovery attachment showing the outer evacuator nozzle positioned in front of the substrate.

FIG. 3 is a side sectional view of the coating and ablation applicator with a debris recovery attachment depicting the inner supersonic nozzle mounted coaxially within the outer evacuator nozzle, and showing the trigger switch for controlling the two-phase flow.

FIG. 4 is a top sectional view of the coating and ablation applicator with a debris recovery attachment illustrating the non-axisymmetric embodiment of the inner supersonic nozzle.

FIG. 5 is diagram comparing the two-phase particle distribution patterns for an axisymmetric versus a non-axisymmetric cross sectional shape of the inner supersonic nozzle.

FIG. 6 is a front side view of the coating and ablation applicator with a debris recovery attachment viewed from the exit ports of both the inner supersonic nozzle and the outer evacuator nozzle showing a gasket or o-ring seal embodiment on the lip of the outer evacuator nozzle.

DETAILED DESCRIPTION OF THE INVENTION

Figure 1:
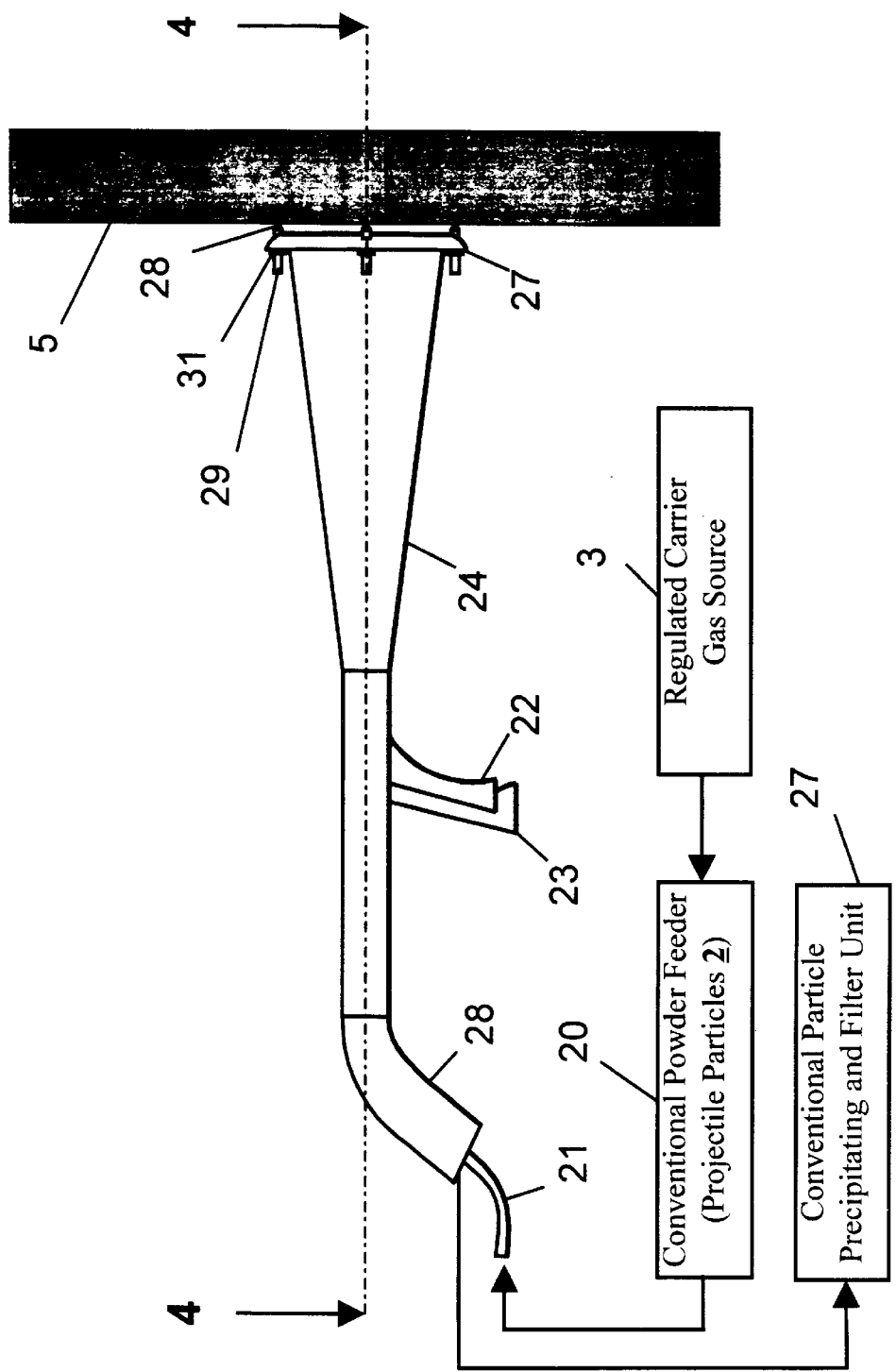
Figure 2:
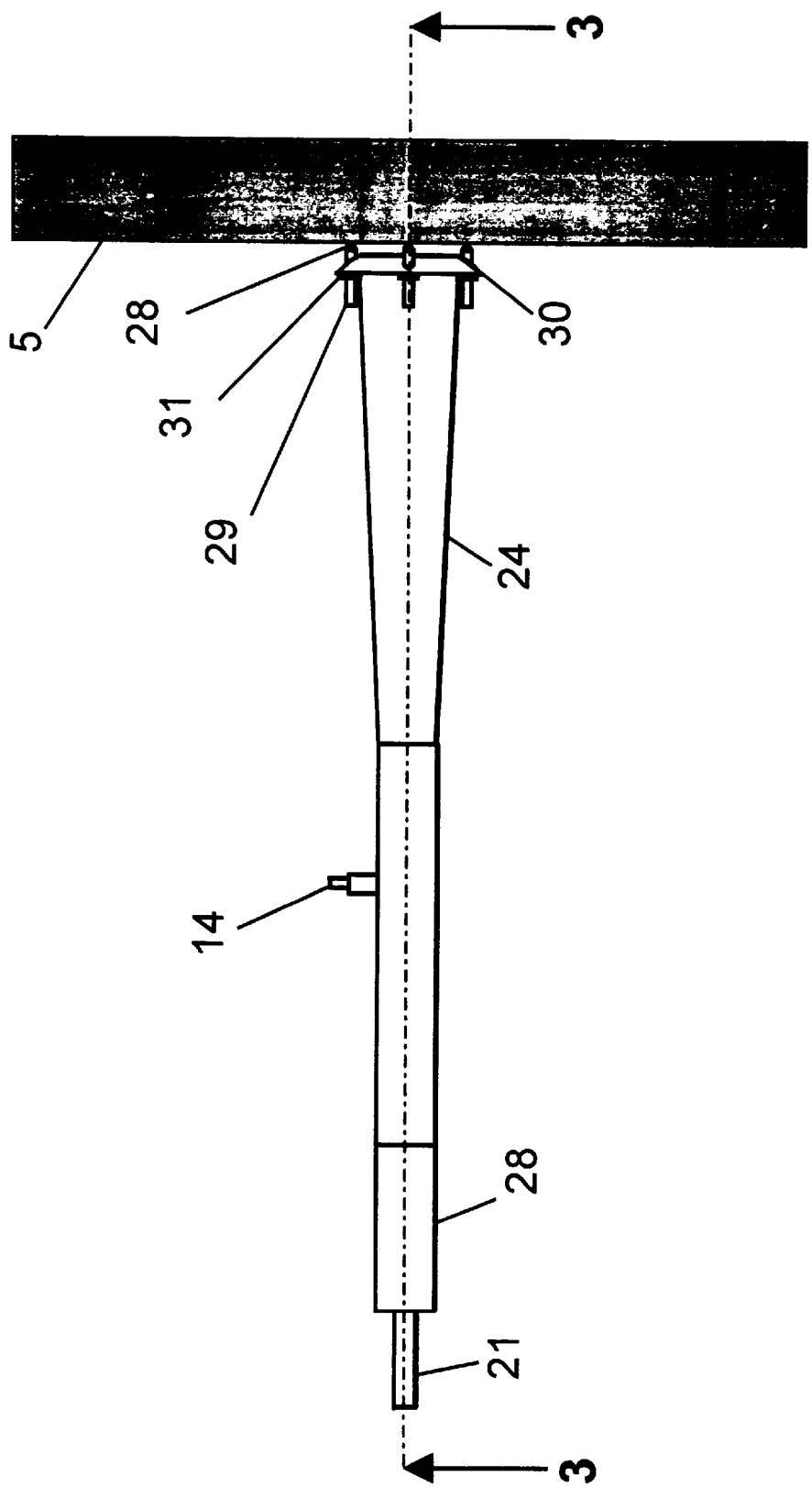
Figure 3:
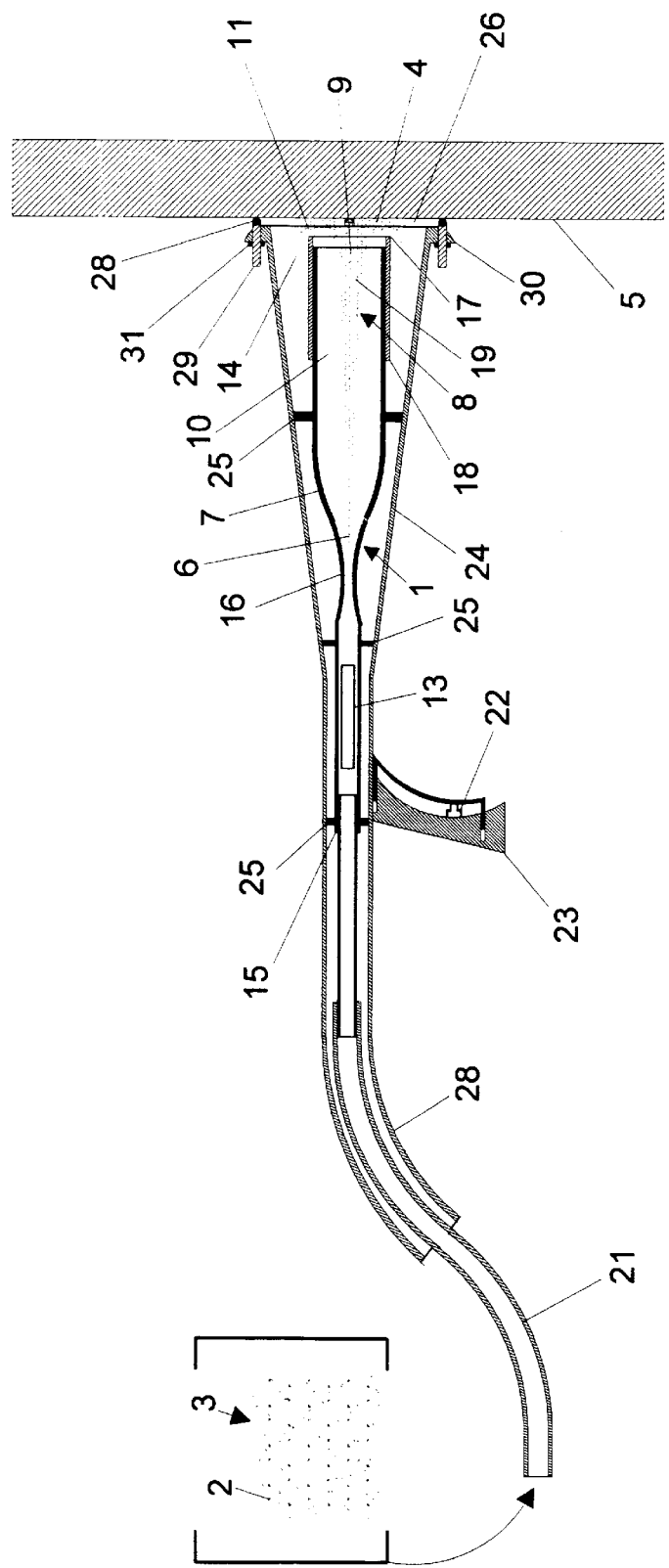
Figure 4:
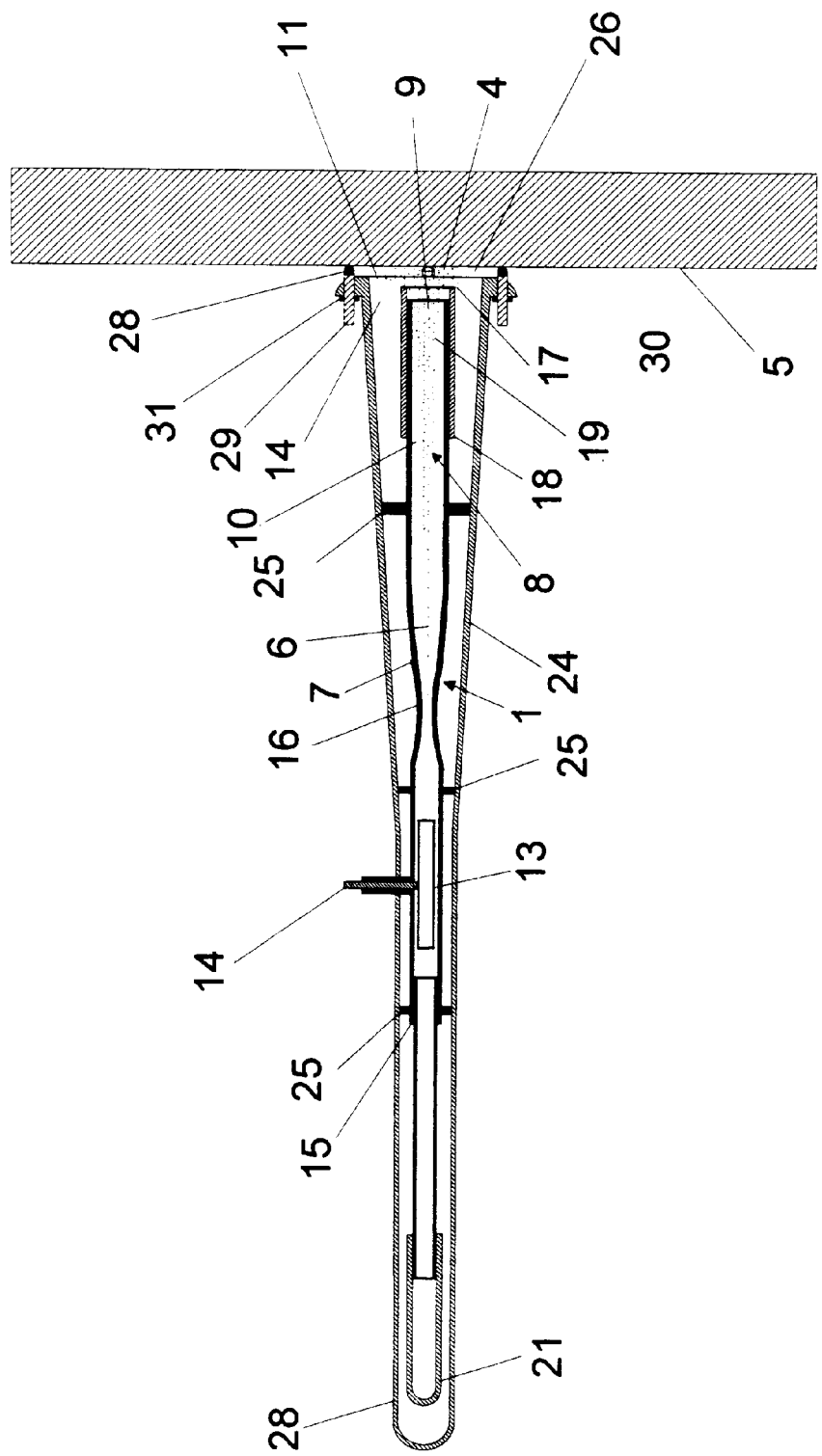

In the preferred embodiment of the invention (see FIGS. 1–4), the coating and ablation applicator with a debris recovery attachment comprises an inner supersonic nozzle 1 for accelerating and triboelectrically charging projectile particles 2 entrained in a carrier gas 3. The speed of the triboelectrically-charged projectile particle 2 coupled with the simultaneous electrostatic discharge 4 at the substrate 5 provides sufficient interaction energy to allow coating or ablation of the substrate 5 when the two-phase flow jet 6 impacts the substrate 5. The coating or ablation process is determined by the material properties of the triboelectrically-charged projectile particles 2 and the substrate 5, as well as the combined interaction energy of the collision coupled with the electrostatic discharge 4.

Figure 5:
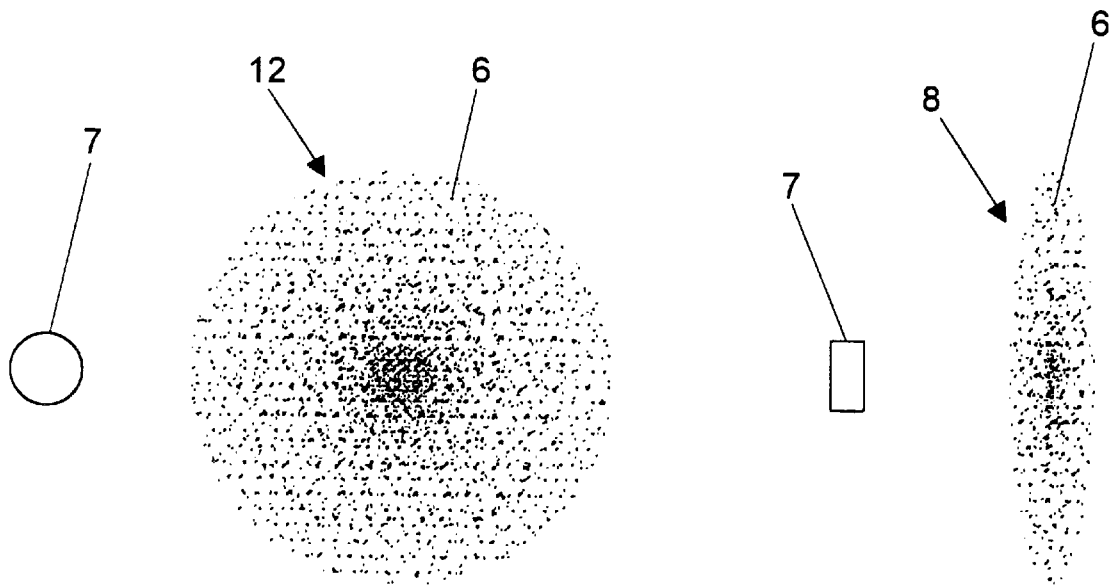

The supersonic expansion contour 7 of the inner supersonic nozzle 1 is non-axisymmetric in cross-sectional shape. The noise reduction advantages of a non-axisymmetric elliptical design have been disclosed in U.S. patent application Ser. No. 08/095,563 to Seiner et. al. For this embodiment, the non-axisymmetric shape provides the means for focusing the two-phase flow jet 6 into a fan-shaped particle distribution 8 centered about the central axis 9 of the inner supersonic nozzle 1 which provides a more effective means for reducing the carrier gas 3 pressure within the fan-shaped particle distribution 8 below ambient pressure as the gaseous supersonic boundary layer 10 rotates through the Mach turning angle 11 at the substrate 5. In alternative embodiments, the inner supersonic nozzle 1 may be axisymmetric in cross sectional shape to provide a Gaussian axisymmetric particle distribution of the two-phase flow jet 6. Referring specifically to FIG. 5, the Gaussian axisymmetric particle distribution 12 in the non-focused two-phase flow jet 6 provided by an axisymmetric supersonic expansion contour 7 is compared to the fan-shaped particle distribution 8 provided by a non-axisymmetric supersonic expansion contour 7.

The materials of construction for the supersonic nozzle 1 are designed to enhance the triboelectric charging of the projectile particles 2. These materials include metals, ceramics, plastics, or composites. In other embodiments of this invention, electrode pads 13 are installed on the inner surface of the supersonic nozzle 1 at various locations for inducing triboelectric charging or for applying a voltage source via electrical feedthrough 14 for charging the particles 2 via electrical induction, ion mobility or triboelectric mechanisms.

The inner supersonic nozzle 1 is further characterized by an axisymmetric converging shape along the length of the nozzle at the inlet 15 which first provides a transition of the two-phase flow jet 6 to sonic velocities (speed of sound) within the throat 16 of the inner supersonic nozzle 1. Subsequently, the two-phase flow jet 6 is expanded by the supersonic expansion contour 7 (along the length of the nozzle) at the outlet 17 to velocities in excess of the speed of sound in the two-phase flow jet 6. In addition, the supersonic expansion contour 7 (along the length of the nozzle) is also shaped to provide approximately parallel and shock-free flow of the two-phase flow jet 6 at the nozzle outlet 17. Fluid dynamic flow theory teaches that the set of hyperbolic differential equations defined by the conservation of mass, momentum, and energy can be integrated using a space-marching procedure to determine the equations of motion for both the particle 2 and the carrier gas 3 in the inner supersonic nozzle 1. By performing such computational fluid dynamic calculations (three dimensional grid) and accounting for the thermal equilibrium exchange between the particle 2 and the carrier gas 3, the shape of the supersonic expansion contour 7 is optimized to achieve the approximately parallel and shock-free flow of the particles 2 at velocities well in excess of the speed of sound in the two-phase flow jet 6.

The inner supersonic nozzle 1 also consists of a telescoping nozzle extender 18 to provide the means for adjusting the spacing between the nozzle outlet 17 and the substrate 5. This spacing is critical for achieving the proper fluid dynamic coupling for reducing the carrier gas 3 pressure below ambient within the fan-shaped particle distribution 5. The pressure reduction is achieved via the aspiration efficacy of the gaseous supersonic boundary layer 10 rotating through the Mach turning angle 11 at the substrate 5. With a large spacing, the gaseous supersonic boundary layer 10 rotates through small incremental acute angles without establishing a significantly lower pressure in the central core 19 of the two-phase flow jet 6. Conversely, with too small of a spacing, the gaseous supersonic boundary layer 10 is sufficiently impeded at the nozzle outlet 17 so as to break down the approximately parallel and shock free flow of the two-phase flow jet 6. This spacing is also critical for successfully directing the triboelectrically-charged projectile particles 2 to the substrate 5 so as to increase the electrostatic discharge interaction energy at the substrate 5 which in turn affects the efficiency and properties of the coating or ablation process.

The projectile particles 2 are entrained into the carrier gas 3 of the inner supersonic nozzle 1 using conventional powder feeders 20 designed to operate at high pressures (e.g. similar to the powder feed units disclosed by: U.S. Pat. No. 4,808,042 to Muehlberger, et al., U.S. Pat. No. 4,740,112 to Muehlberger, et al., U.S. Pat. No. 4,726,715 to Steen, et al., U.S. Pat. No. 4,561,808 to Spaulding, et al., or U.S. Pat. No. 3,565,296 to Brush, et al.). The carrier gas 3 in this embodiment of the invention is compressed air at approximately ambient temperature and inlet 15 pressures sufficiently high to induce supersonic two-phase (approximately parallel and shock free) flow with the inner supersonic nozzle 1. In alternative embodiments of this invention, the carrier gas 3 may comprise, but not be limited to, nitrogen, argon, helium, hydrogen, oxygen, steam, gases specifically selected to enhance triboelectric charging (e.g. sulfur hexaflouride), or mixtures thereof. The properties of the carrier gas 3 selected for accelerating the projectile particles 2 depends on drag coefficient, gas density and supersonic speeds, the triboelectric charging efficacy, as well as the chemical stability of the substrate 5 after removal of the uppermost layer. In some applications, a chemically active carrier gas 3 may be desirable to treat the surface of the substrate 5 immediately following the removal of an uppermost layer.

The projectile particles 2 entrained within the carrier gas 3 are conveyed to the inner supersonic nozzle 1 through a conventional electromechanical valve (associated with the powder feeder 20) and the high pressure hose 21. The electrical trigger switch 22 mounted within the pistol grip 23 of the outer evacuator nozzle 24 is used to control the flow of the two-phase flow jet 6 via the actuation of the electromechanical valves associated with the conventional powder feeder 20 and the carrier gas 3 regulated source.

The inner supersonic nozzle 1 is coaxially mounted within the outer evacuator nozzle 24 using struts 25 which provide the means for adjusting and aligning the impingement angle of the two-phase flow jet 6 on the substrate 5. The struts 25 are removably mounted or bonded to the inner supersonic nozzle 1 and the outer evacuator nozzle 24 to maintain the desired alignment.

The outer evacuator nozzle 24 comprises a subsonic nozzle coaxially surrounding the inner supersonic nozzle 1 having its contour designed to accommodate the two-phase fluid dynamic recovery of the carrier gas 3, excess projectile particles 2, and the ablated substrate 5 material. In addition, this embodiment of the outer evacuator nozzle 24 provides for an air-bearing channel 26 between the outlet of the outer evacuator nozzle 24 and the substrate 5. The influx of air or ambient gas through the air-bearing channel 26 provides a fluid dynamic air bearing and prevents environmentally hazardous materials from escaping into the air. The carrier gas 3 discharged from the inner supersonic nozzle 1 and the influx of air or ambient gas evacuated through the air-bearing channel 26 provide the means for conveying the excess projectile particles 2 and the ejected substrate 5 material through the outer evacuator nozzle 24 to a conventional particle precipitating and filter unit 27 via a low pressure discharge hose 28. The conventional particle and precipitating and filter unit 27 (similar to U.S. Pat. No. 5,035,089 Tillman, et al., or U.S. Pat. No. 4,723,378 VanKuiken, Jr., et al.) uses an exhaust suction blower to evacuate and filter the carrier gas 3, air, or ambient gases entrained with excess projectile particles 2 and ejected substrate 5 materials. The carrier gas 3, air, or other gases may be recompressed and recycled to provide a new supply of high pressure carrier gas 3 to the inner supersonic nozzle 1.

The outer evacuator nozzle 24 is offset from the substrate 5 by a plurality of spherical roller bearings 28 (e.g. as disclosed by U.S. Pat. No. 4,203,177 to Kegg, et al.). The offset provided by the spherical roller bearing 28 is adjusted by the screw bolt 29 mounted on the lip 30 of the outer evacuator nozzle 24. A locking nut 31 provides the means for locking the screw bolt 29. This offset is also adjusted in combination with the supersonic nozzle 1 to achieve the optimum spacing required for promoting the electrostatic discharge 4 of the triboelectrically-charged projectile particles 2 at the substrate 5.

Figure 6:
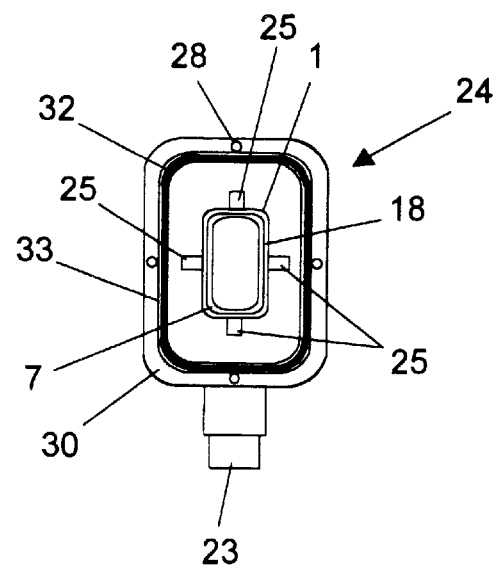

In alternative embodiments of the present invention, referring now to FIG. 6, the lip 30 of the outer evacuator nozzle 24 is mounted in direct contact with the substrate 5. A gasket or o-ring seal 32 installed in a groove 33 of the lip 30 prevents the carrier gas 3 or environmentally hazardous materials from escaping into the air. In applications used to mill the substrate 5 or produce special nanoscale particles, this same gasket or o-ring seal 32 is used to prevent chemical attack or oxidation of the captured substrate materials 5 within the inert gaseous environment provided by the carrier gas 3.

The materials of construction for both the inner supersonic nozzle 1 and the outer evacuator nozzle 24 are light weight metal, polymer, or composite materials which provide a light weight applicator capable of operating in any orientation and enhancing the triboelectric charging of the projectile particles 2. The inlet 15 of the inner supersonic nozzle 1 requires materials of construction with sufficient strength to safely contain the high pressure carrier gas 3.

Figure 7:
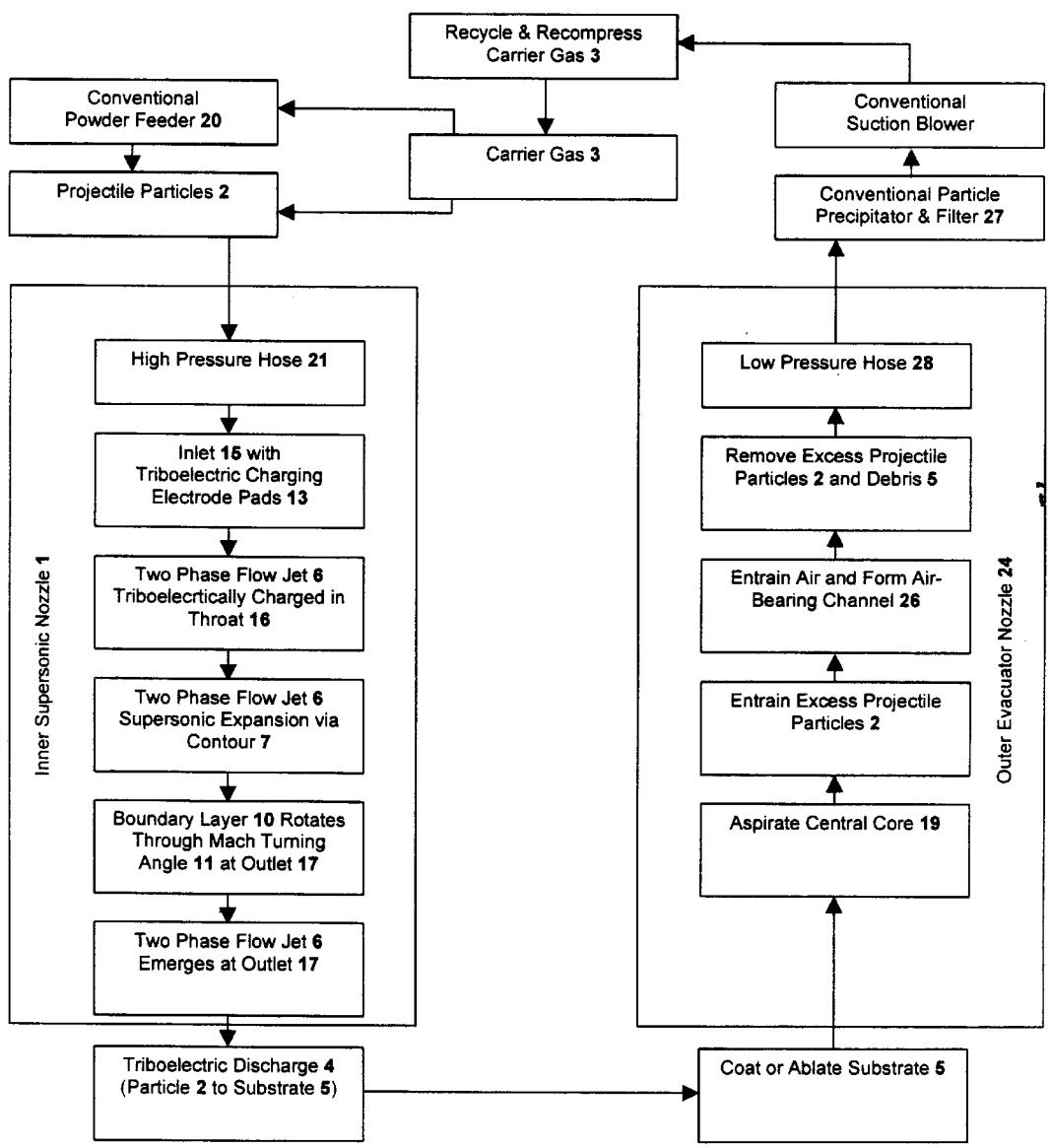
FIG. 7 depicts a flow chart of the salient features and flow processes of the two-phase flow through the coating and ablation applicator with a debris recovery attachment.

FIG. 7 is a flow chart of the salient features and processes of the two-phase flow through the coating and ablation applicator with a debris recovery attachment. The process starts by injecting a carrier gas 3 at ambient temperature and at a sufficiently high-regulated pressure into a conventional powder feeder 20. The carrier gas 3 with entrained projectile particles 2 are combined with an additional flow of carrier gas 3. Next, the high pressure carrier gas 3 with a sufficiently loaded concentration of projectile particles 2 are conveyed to the inlet 15 of the inner supersonic nozzle 1 via the high pressure hose 21. Triboelectric charging of the projectile particles 2 begins at this stage via particle rubbing in contact with the inner walls of the inner supersonic nozzle 1, the rubbing of particles on the triboelectric charging pads 13, and the charge induction provided by the charging voltage source connected via feedthrough electrodes 14. The carrier gas 3 flows through the throat 16 of the inner supersonic nozzle 1 at the sonic speeds of the carrier gas 3 and begins to accelerate the entrained projectile particles 2 to the sonic speed of the carrier gas 3. At the same time, as the particles 2 rub against the inner walls of the supersonic nozzle 1 throat 16 or other triboelectric charging electrode pads, and the particles 2 are triboelectrically charged by rubbing contact and charge induction. Further expansion of the carrier gas 3 provided by the contour 7 of the inner supersonic nozzle 1 drives the carrier gas 3 to supersonic speeds and continues to accelerate the entrained triboelectrically-charged projectile particles 2 to speeds comparable to the supersonic speed of the carrier gas 3 over the length of the nozzle. This process forms a two-phase flow jet 6 which eventually impinges on the substrate 5 near outlet 17 of the inner supersonic nozzle 1. Electrostatic (triboelectric) discharges 4 occur at the substrate 5 that increases the total interaction energy of the collisional event and affects the coating or ablation of the substrate 5. A portion of the carrier gas 3 in the boundary layer 10 of the inner supersonic nozzle 1 separates from the two-phase flow jet 6, and is used to evacuate carrier gas 3 from the central core 19 of the two-phase flow jet 6 near the substrate 5. This evacuation is induced by the aspiration efficacy associated with rotating the boundary layer 10 of the carrier gas 3 through the Mach turning angle 11 at the outlet 17 of the inner supersonic nozzle 1. This aspiration provides the means for reducing the pressure of the carrier gas 3 near the central core 19 below ambient pressure which allows the projectile particles 2 to proceed unimpeded toward the substrate 5, and reduces the inlet 15 pressure levels required to achieve approximately parallel and shock free flow. Finally, the carrier gas 3 with excess projectile particles 2 and materials ablated from the substrate 5, is combined with additional ambient air evacuated through the air-bearing channel 26 and conveyed with a conventional suction blower associated with a conventional particle precipitator and filter unit 27 via the outer evacuator nozzle 24 and the low pressure discharge hose 28. The evacuated carrier gas 3 is also recompressed and recycled within specific embodiments of this invention.

Figure 8:
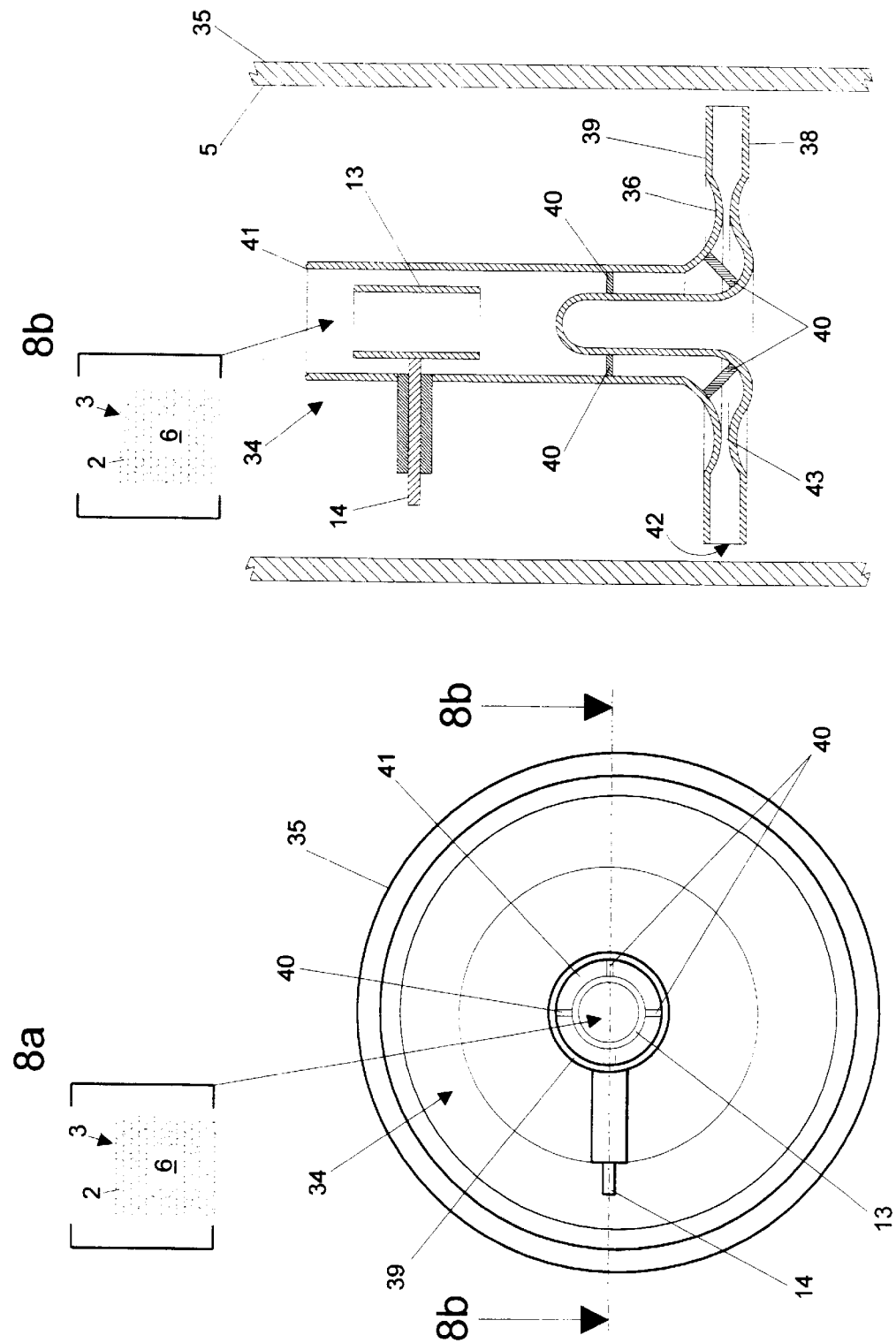
FIG. 8 depicts a side and top sectional view of the axisymmetric cylindrical nozzle used for coating and ablating the internal surface of a cylinder bore substrate.

A nozzle applicator 34 (referring now to FIG. 8) for coating and ablating the internal surface of a cylinder bore substrate 35 is also disclosed as a special embodiment of this invention. The nozzle applicator 34 is configured as an axisymmetric supersonic nozzle with a circumferential converging and diverging throat section 36 formed by connecting the lower plate 38 to the upper plate and tube 39 using mounting pins 40. The two-phase flow jet 6 containing the triboelectrically-charged projectile particles 2 is injected into the inlet 41 of the nozzle applicator 34 to allow coating or ablation of the substrate 5 associated with the internal surface of the cylinder bore substrate 35. The materials of construction for the nozzle applicator 34 are designed to enhance the triboelectric charging of the projectile particles 2. These materials include metals, ceramics, plastics, or composites. In other embodiments of this invention, electrode pads 13 are installed on the inner surface of the nozzle applicator 34 at various locations for inducing triboelectric charging or for applying a voltage source via electrical feedthrough 14 for charging the particles 2 via electrical induction, ion mobility or triboelectric mechanisms. The inlet 41 of the nozzle applicator 34 requires materials of construction with sufficient strength to safely contain the high pressure carrier gas 3.

The length of the nozzle applicator 34 beyond the circumferential converging and diverging throat section 36 is adjusted and sized to achieve the proper spacing between the nozzle outlet 42 and the internal surface of the cylinder bore substrate 35. This spacing is critical; 1) for achieving the proper fluid dynamic coupling, 2) for reducing the carrier gas 3 pressure below ambient, and 3) for directing the triboelectrically-charged projectile particles 2 to the internal surface of a cylinder bore substrate 35 so as to increase the electrostatic discharge interaction energy at the internal surface of a cylinder bore substrate 35.

Segmented sections of the nozzle applicator 34 in which the circumferential converging and diverging throat section 36 is periodically closed by deforming and attaching (e.g. by spot welding) the lower plate 38 to the upper plate and tube 39 at the narrowest part of the throat section 43 is also disclosed as an alternative embodiment of the nozzle applicator 34.

The process for coating or ablating the internal surface of the cylinder bore substrate 35 using the nozzle applicator 34 comprises translation and rotation of the nozzle applicator 34 up and down and circumferentially around the internal surface of a cylinder bore substrate 35. Techniques for depositing ribbed profiles or lubrication cavities on the internal surface of a cylinder bore substrate 35 is envisioned with appropriate control of the translation and rotation movements of the nozzle applicator 34. The simultaneous use of various types of triboelectrically-charged projectile particles 2 fed by a plurality of conventional powder feeders 20 is also disclosed as a method for creating functionally graded coatings by overlapping and interleaving the various layers to form coatings with unique material and physical properties. This functionally graded process is applicable to both the inner supersonic nozzle 1 and the nozzle applicator 34 of the disclosed coating and ablation applicators.

Techniques for cleaning or ablating the internal surface of a cylinder bore 35 is disclosed with suitable selection of the projectile particles 2, the carrier gas 3, and the appropriate control of the translation and rotation movements of the nozzle applicator 34. For example, in one particular embodiment, the carrier gas 3 may be selected as steam which when adiabatically expanded cools the steam to a sufficiently low temperature that ice crystals formed in the nozzle applicator 34 and are accelerated to speeds sufficiently high to impact and ablate the internal surface of the cylinder bore 35.

Examples of reducing this invention to practice are disclosed below wherein brass supersonic nozzle and a plastic debris recovery attachment was fabricated into laboratory version of the coating and ablation applicator with a debris recovery attachment. The brass supersonic nozzle for these experimental investigations was fabricated with a rectangular cross section having a throat dimension of approximately $\frac{1}{16}$ inch×$\frac{1}{16}$ inch square with a rectangular outlet dimension of approximately $\frac{1}{16}$ inch×$\frac{5}{15}$ inch. The converging section of the brass nozzle was transitioned from a $\frac{1}{4}$-inch NPT brass tube to the square throat section. The contour of the rectangular diverging section was shaped to yield a MACH 2-3 supersonic nozzle based on the area expansion for the isentropic flow process and the type of gas driven through the nozzle. This laboratory version of the coating and ablation applicator with a debris recovery attachment was tested using a variety of gases (e.g. argon, helium, and nitrogen), a broad class of metallic powder particles (e.g. aluminum, chromium, copper, nickel, tungsten, and zinc), a representative selection of nonmetallic powder particles (e.g. diamond powder, low density polyethylene, silicon carbide, teflon), and an assortment of substrates (e.g. aluminum, alumina ceramic, aluminum nitride ceramic, brass, copper, high density polyethylene, silicon, stainless spring steel, teflon, and tin). This research work demonstrated four fundamental applications of the coating and ablation applicator with a debris recovery attachment. 1) The metallization of metal, semiconductor, ceramic, polymer, and composite substrates referred to as kinetic energy metallization. 2) The deposition of polymers and nonmetallic powder particles onto metals, semiconductors, polymers, ceramics, and composites called kinetic energy polymerization. 3) The implantation of metal and nonmetal powder particles into polymers and composites referred to as kinetic energy implantation. 4) The ablation of metals, semiconductor wafers, polymers, ceramics, and composites with hard metallic and nonmetallic powder particles cited as kinetic energy ablation.

Examples of kinetic energy metallization are outlined below.

A zinc coating was deposited on brass by loading approximately 250 ml of zinc powder particles (7 micron diameter) into a conventional Venturi powder feeder modified for high pressure operation. A compressed gas source of commercial grade nitrogen regulated down to a pressure of 150–200 psig was used to drive a conventional Venturi powder feeder and the inner supersonic nozzle. The inner supersonic nozzle was adjusted within the mounting struts of the debris recovery nozzle to a provide a nozzle exit-to-substrate gap of approximately $\frac{1}{16}$ to $\frac{1}{8}$ inch which was experimentally determined to be the optimum fluid dynamic coupling to reduce the exit pressure at the substrate. The debris recovery attachment was connected to a conventional shop vacuum unit to recover the excess powder particles. A spot deposition of zinc onto a brass sheet was permitted to build up to a thickness of approximately $\frac{1}{16}$ of an inch. During the deposition, electrostatic discharges occurring at the substrate were visually observed. In subsequent testing, an amplitude modulated conventional radio was used to qualitatively monitor the frequency of electrostatic discharges occurring during the deposition process. The zinc on brass sample was analyzed with a scanning electron microscope, and the deposited zinc layer showed excellent bonding of the zinc powder to the brass with a distinct diffusional interface. Furthermore, the micrograph showed fine to ultra-fine microstructure within the zinc coating which was attributed to the combination of the triboelectric discharges occurring during deposition and the degree of powder particle fusion which occurs during the impact collisions of the small diameter particles.

A substrate rotational fixture, driven by a flexible driveline powered by a variable speed electric drill, was interfaced to the coating and ablation applicator with a debris recovery attachment. This rotational fixture allowed thinner (e.g. on the order of a few hundred microns thick) zinc coatings to be deposited onto the brass substrate sheet over a larger of area of approximately 0.5 to 1.0 square inches. Investigations of the zinc coating quality as a function of the rotation speed eventually led to the discovery that the coating material properties are influenced by the dwell time of the impacted region undergoing triboelectric discharge and collisional impact. Stationary spot coatings with dwell times on the order of 10–20 seconds produced thick coatings (i.e. $\frac{1}{16}$ inch thick) with a dark metallic color, while the rotation coatings with dwell times on the order of a milliseconds deposit a light metallic colored zinc coating (i.e. a few hundred microns thick).

Aluminum coatings onto brass, tin, and steel were likewise produced by loading approximately 250 ml of 20 micron diameter aluminum powder particles in the conventional Venturi powder feeder modified for high pressure operation. Spot coatings of aluminum were produced by driving the inner supersonic nozzle and powder feeder with a compressed gas source of commercial grade nitrogen regulated down to pressures of 450 psig.

Higher melting point coatings (e.g. chromium, copper, nickel and tungsten) were deposited on aluminum (0.030 inch thick) and stainless spring steel (0.030 inch thick) by loading the conventional Venturi powder feeder modified for high pressure operation with approximately 250 ml of the respective powders. Generally the powders selected were in the 1–3 micron diameter size, however the chromium and copper powders were also selected as large as 325-mesh powder. Tungsten (1–12 micron diameter) was also used for these experimental demonstrations of the invention. The velocities for depositing powders with high melting points and high specific heats were calculated (i.e. based on theoretical conversion of triboelectric and kinetic energy to heat and inelastic particle deformation) to be in the range from 1000–1500 meters/second in order to achieve good coating efficiency. Ultra-thin coating depositions at velocities greater than 300 meters/second, but less than 1000 meters/second performed by using compressed nitrogen at regulated pressures up to 500 psig were achieved, provided the dwell time of the nozzle over the collisionally impacted and triboelectrically discharged area was increased to compensate for the lower kinetic energy per particle. Obviously, the latter case resulted in a much lower deposition efficiency, and ultimately became an ablation process when the impact kinetic energy resulted solely in elastic collisions at the substrate. The best coatings of these high melting point and high specific heat materials (e.g. chromium, copper, nickel and tungsten) were achieved when compressed helium gas (commercial grade) regulated down to pressures in the range of 100–500 psig was used to drive both the inner supersonic nozzle and the conventional Venturi powder feeder modified for high pressure operation. This experimental investigation verified that the higher particle velocities (i.e. particle velocities accelerated in the helium gas having a speed of sound at least 2.8 times higher than that of nitrogen or air at a comparable temperature) were responsible for the improved coating efficiency. Once again, during the deposition of the chromium, copper, nickel and tungsten powders, electrostatic discharges occurring at the substrate were visually observed and monitored with an amplitude modulated conventional radio. Chromium, copper, nickel, and tungsten coating with thickness estimated to be in the range of 50–100 microns were deposited onto stainless spring steel using the rotation fixture described earlier. Finally, chromium, nickel, and tungsten coatings with estimated thickness up to 1500 microns were deposited onto stainless spring steel over areas of approximately 0.5 to 1.0 square inches.

While the initial depositions of the higher melting point powder materials onto stainless spring steel were quite pure, it was visually observed that later coatings of chromium, nickel, and tungsten onto stainless spring steel had a yellowish like color which when burnished showed an alloying of brass mixed with the higher melting point materials. Subsequent analysis of the tungsten coating deposited onto stainless spring steel with a fluorescence X-ray analyzer yield constituents of brass as well as tungsten. This experimental work led to the discovery disclosed in this invention, that an ablative nozzle could be used to generate alloy coatings. Stainless steel and ceramic nozzles were designed and fabricated to reduce or eliminate the ablative process associated with brass nozzles.

Kinetic energy metallization of ceramics was also reduced to practice for the deposition of chromium onto alumina and aluminum nitride ceramic coupons (approximately $\frac{1}{16}$ inch thick). For these tests, approximately 250 ml of 325 mesh chromium powder was loaded into the conventional Venturi powder feeder modified for high pressure operation. Compressed helium gas (commercial grade) regulated down to a pressure of 300 psig was used to drive both the powder feeder and the inner supersonic nozzle. Although some difficulties were encountered with uniformly feeding the chromium powder, thin (estimated to be less than 100 micron thick) chromium coatings were deposited on these ceramics over a 0.5–1.0 square inch area using the rotation fixture. Attempts to deposit aluminum, nickel, and tungsten onto the alumina and aluminum nitride ceramic coupons were only marginally successful, because the oxidation potential and multi-valent bonding chemistry between these elements and ceramics was not as favorable. More research work will be required with ceramic coatings to match the particle velocities and the interface bonding properties. Deposition of functionally graded coatings using the coating and ablation applicator with a debris recovery attachment is expected to improve the quality of the metal-to-ceramic coatings and enable production of semiconductor substrates.

An example of kinetic energy implantation of polymers was also demonstrated with the coating and ablation applicator with a debris recovery attachment. In this case, approximately 250 ml of nickel powder (1–3 micron diameter) was loaded into the conventional Venturi powder feeder modified for high pressure operation, and the nickel powder was implanted into a high-density polyethylene substrate using compressed gas source of commercial grade nitrogen regulated down to a pressure of 100–125 psig. The deposition over a 0.5–1.0 square inch area was achieved by rotating the high density polyethylene substrate sheet (approximately $\frac{3}{16}$ inch thick) under the exit of the inner supersonic nozzle. Again, the excess particles were collected in the shop vacuum dust collector via the debris recovery attachment. Subsequently, the nickel samples implanted into the high-density polyethylene sheet had 22–24 gauge multi-strand electrical wires soldered to the nickel implants. Pull testing of the soldered wires demonstrated good adhesion of the nickel-implanted samples. Electrical resistivity tests of the implanted nickel powders indicated qualitatively high resistance compared to metallic nickel. It is anticipated that more conductive coatings can be deposited onto these metal-to-polymer foundation strips to achieve an environmentally compliant method for producing printed circuit boards. Other samples of copper powder (325 mesh) implanted into high density polyethylene were produced to demonstrate the broader applications of the kinetic energy implantation methods. Attempts to implant the nickel powders into TEFLON™ and PEEK plastic were not as successful, as these polymers have some tendency to pyrolyze under the impact conditions. More research work will be required to select the appropriate particle size and velocity to enable implantation of a broad class of polymers.

Depositions of low-density polyethylene powder particles (estimated to be in the 50–100 micron range) onto aluminum and brass substrates were performed using the coating and ablation applicator with a debris recovery attachment to demonstrate the kinetic energy polymerization technique. In these experiments, approximately 250 ml of low density polyethylene powder was loaded in the conventional Venturi powder feeder modified for high pressure operation, and deposits (estimated to be 100–200 microns thick) onto aluminum and brass substrates over areas ranging from 0.5–5 square inches were made. The gas used for these deposits was compressed nitrogen (commercial grade) regulated down to 100 psig. Tape adhesion tests of the low-density polyethylene depositions demonstrated excellent adhesion with no coating removal. Once again, the excess powders were collected with a conventional shop vacuum cleaner via the debris recovery attachment.

Successful experiments were also performed to demonstrate nonmetallic depositions onto aluminum using 20 nanometer diamond powder in 3 micron agglomerations. In these tests, compressed helium gas (commercial grade) regulated down to 250–450 psig range and, independently, compressed argon gas (commercial grade) regulated down to 250 psig was used to drive both the Venturi powder feeder and the inner supersonic nozzle of the coating and ablation applicator with a debris recovery attachment. In this case, only approximately 100 ml of the diamond powder was available. Excellent diamond coatings (estimated to be 100 microns thick) were deposited onto the aluminum substrate (0.030 inch thick), as verified by passing the tape adhesion tests. These diamond coatings are expected to enable new methods of producing diamond film capacitors as well as abrasion resistance substrate surfaces.

Finally, the coating and ablation applicator with a debris recovery attachment was used to ablate the surface of a silicon wafer to demonstrate an improved technique for milling silicon wafers. For this ablation application, silicon carbide (400 mesh) powder was loaded into the Venturi powder feeder. Compressed nitrogen gas (commercial grade) regulated down to a pressure of 50 psig was used to drive both powder feeder and the inner supersonic nozzle. Initially, spot areas (approximately 1/8×1/4 inch) were ablated into the silicon wafers (20 mils thick) down to thickness of 3–5 mils. Scanning electron micrographs of the ablation regions showed no cracking of the substrate, although some smoothed pits were observed. Subsequently, the rotation fixture described above was used to rotate the silicon wafer under the inner supersonic nozzle at a gap spacing of approximately 1/16 to 1/8 inch. A ring approximately 1/8 inch wide and diameter of 3/4 inch was ablated down to a depth of approximately 10 mils out of the total thickness of 20 mils for the wafer. No cracking or fracture of the wafer occurred in the process. During all these tests, the silicon carbide powder particles and the ablated silicon particles were collected within the filter and debris recovery system of the conventional shop vacuum cleaner via the debris recovery nozzle. It is anticipated that this ablation method will enable an environmentally compliant technique for milling silicon wafers after installation of large scale integration circuits on the opposite side.

This thin wafer technology is expected to enable faster computer electronic chips by improving the heat transfer from the chip to a coolant substrate.

The examples described above can be repeated with similar success by substituting the generically or specifically described reactants and/or operating conditions of this invention for those used in the preceding examples.

Figure 9:
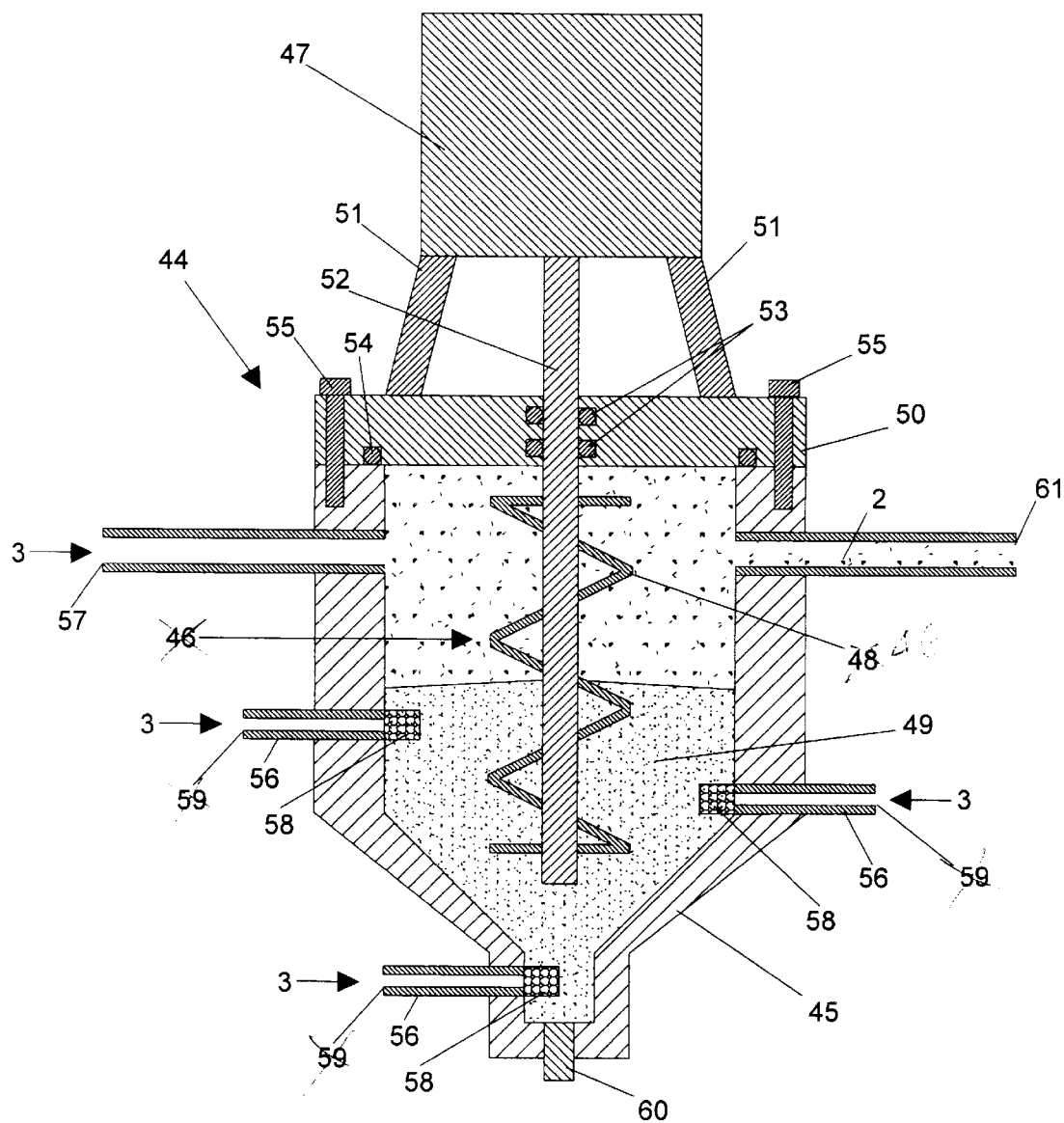
FIG. 9 shows a side sectional view of a powder feeder for fluidizing powders into a high pressure process line using fluidizing ports and a motor driven agitator mechanism.

FIG. 9 shows a fluidizing powder feeder 44 suitable for use with the coating and ablation applicator of the present invention. Fluidizing powder feeder 44 includes a hopper 45, a mixing device 46, an inlet port 57, and an outlet port 61. Fluidizing powder feeder 44 fluidizes and entrains a powder 49 as projectile particles 2 within a carrier gas 3. Fluidizing powder feeder 44 is capable of creating a substantially uniform mixture of projectile particles 2 and carrier gas 3 and allowing a high concentration of projectile particles 2 to be fluidized and entrained within carrier gas 3.

Hopper 45 is a vessel, container, or conventional hopper designed to hold powder 49. Hopper 45 includes a lid 50, O-rings 54, bolts 55, and a plug 60. Lid 50 is installed onto hopper 45 and sealed for high-pressure operation with one or more O-rings 54 and by fastening lid 50 with bolts 55. Plug 60 may be used to seal a drain port in hopper 45 and to allow powder 49 to be drained from hopper 45.

Inlet port 57 introduces carrier gas 3 into hopper 45. Mixing device 46 may be a mechanical device or system that mixes powder 49 and carrier gas 3 in order to fluidize and entrain powder 49 as projectile particles 2 within carrier gas 3. This mixture of powder 49 (in the form of projectile particles 2 entrained in carrier gas 3) then exits through outlet port 61, and may be sent to a powder reactor for treatment or to the coating and ablation applicator described above. More than one fluidizing powder feeder 44 may be used in parallel feeding a plurality of inner supersonic nozzles 1 to simultaneously coat or ablate large surface areas. Multiple fluidizing powder feeders 44 may also be connected to a manifold connected to a single nozzle with a large throat or to multiple inner supersonic nozzles 1. The use of multiple fluidizing powder feeders 44 connected to a manifold or a single nozzle also permits mixing different types of powders 49 or different types of carrier gases 3.

Mixing device 46 may include an agitator 46 that can be driven at various controlled speeds. Agitator 46 may be an auger or similar screw-like device that can be operated at sufficiently high speeds to lift and fling powder 49 into carrier gas 3. Agitator 46 is coupled to a motor 47 mounted to lid 50 with brackets 51 and coupled to agitator 46 via a shaft 52. Shaft 52 may rotate in lid 50 using one or more rotational seals 53 designed for high-pressure operation in an abrasive environment. Agitator 46 may also be a conveyor chain equipped with buckets which can lift and dump powder 49 into carrier gas 3. The speed of motor 47 connected to agitator 46 may also be adjusted and controlled to achieve a specific mass loading concentration of projectile particles 2 entrained in carrier gas 3 prior to ejection into outlet port 61. This fluidization process is effective in selecting and entraining a distribution of projectile particle sizes from powder 49 by balancing the buoyancy and turbulent forces exerted by carrier gas 3 on projectile particles 2 against the gravitational settling force.

Mixing device 46 may also include one or more fluidizing ports 56 positioned in the walls of hopper 45 and below the powder level in hopper 45. Each of the fluidizing ports 56 is arranged along the sidewall of hopper 45 to provide fluidization of powder 49 as a function of depth. Each of the fluidizing ports 56 may include sintered metal filters 58 for uniformly injecting carrier gas 3, and for preventing backflow of powder 49 into fluidizing ports 56. The pressure of carrier gas 3 injected into fluidizing ports 56 may be set higher than that of the pressure of carrier gas 3 injected into inlet port 57 and the flow rate of carrier gas 3 may be adjusted and controlled to achieve adequate fluidization of powder 49.

EXAMPLE 1

A powder 49 is placed into hopper 45 and the pressure of carrier gas 3 injected into inlet port 57 is regulated to a value in the range of 175–250 psig. Carrier gas 3 may include air, nitrogen, argon, helium, hydrogen, oxygen, steam, sulfur hexaflouride, or a combination of these gases. Carrier gas 3 is injected into fluidizing ports 56 and regulated to a higher pressure up to 500 psig. The differential pressure between carrier gas 3 injected into fluidizing ports 56 and carrier gas 3 injected into inlet port 57 is regulated at specific values depending on the location and depth of each fluidizing port 56 relative to powder 49. Carrier gas 3 injected into a fluidizing port 56 at the greatest depth in powder 49 has the largest differential pressure and is typically 50–100 psig above the inlet port 57 pressure. Similarly, carrier gas 3 injected into a fluidizing port 57 near the top of powder 49 is regulated at a differential pressure of only 25–50 psig above inlet port 57. Carrier gas 3 injected into fluidizing ports 56 may be the same type of carrier gas 3 injected into the process line inlet 57 or it may be a different type of gas to achieve a mixture thereof.

With this configuration and without the use of an agitator, fluidizing powder feeder 44 is capable of entraining projectile particles 2 in carrier gas 3 at concentrations up to 5% by weight depending on the density and particle size of powder 49 and the differential pressures. At this concentration, coating deposition rates of 0.2–1.0 lbm/h have been measured using inner supersonic nozzle 1 having an 0.0625-inch throat diameter with a distribution of powder sizes up to 40 microns in diameter and for various powder densities up to 19 gm/cm$^3$.

By adding an agitator 46 in the form of a rotating auger with a speed ranging from 0–200 rpm, powder 49 is lifted and entrained in carrier gas 3 to achieve increased projectile particle 2 concentrations up to 25% by weight in carrier gas 3. This enables increased deposition rates up to 5 lbm/h for an inner supersonic nozzle 1 with a 0.0625-inch diameter throat. The deposition rates and required powder feeding rates will scale with the throat diameter of inner supersonic nozzle 1, requiring corresponding increased flow rates of carrier gas 3. Flow rates and pressures of carrier gas 3 in combination with rotation speeds, diameter, and pitch of an auger provide a method for entraining projectile particles 2 at specific concentrations in the high-pressure carrier gas 3; and subsequently injecting into high pressure outlet port 61. Thus, fluidizing powder feeder 44 overcomes the feeding uniformity limitations of gravity-fed or gear-metering powder feeders with respect to injection of nanoscale, ultra-fine, or fine powders ejected into a high pressure process line outlet at slow fluid velocities (<50 m/s).

FIG. 10 shows an embodiment of a powder reactor 62 suitable for use with the coating and ablation applicator of the present invention. Powder reactor 62 includes a cavity 65, a treatment device 66, an inlet port 63, and an outlet port 64. Powder reactor 62 permits the mixing and treating of powder 49 injected into cavity 65 by either a conventional powder feeder 20 modified for high-pressure operation or by the fluidizing powder feeder 44 shown in FIG. 9. One or more conventional powder feeders 20 or fluidizing powder feeders 44 may be used to inject various types of powders 49 into inlet ports 63. Powders 49 are mixed and treated within powder cavity 65. This mixing and treatment may be facilitated by treatment device 66. One or more outlet ports 64 may be connected to a plurality of inner supersonic nozzles 1 of the coating or ablation applicator or connected to other applications requiring mixing and treating of powders 49.

Cavity 65 includes a lid 50, O-rings 54, bolts 55, and a plug 60. Lid 50 is installed onto cavity 65 and sealed for high-pressure operation with one or more O-rings 54 and by fastening lid 50 with bolts 55. Plug 60 may be used to seal a drain port in cavity 65 and to allow any powder 49 to be drained from cavity 65.

Inlet port 63 introduces projectile particles 2 entrained in carrier gas 3 into cavity 65. Treatment device 66 effects or facilitates a treatment of powder 49 entrained as projectile particles 2 within carrier gas 3. This treated mixture of powder 49 (in the fomr of projectile particles 2 in carrier gas 3) then exits through outlet port 64, and may be sent to the coating and ablation applicator described above. More than one powder reactor 62 may be used in parallel feeding a plurality of inner supersonic nozzles 1.

The mixing and powder treatment features of powder reactor 62 depend on the specific requirements for powder 49 entrained as projectile particles 2 in carrier gas 3. One embodiment simply uses cavity 65 to classify said projectile particles 2 by size and weight in the buoyant and turbulent carrier gas 3 with any excess powder 49 retrieved in the bottom of cavity 65. The placement of inlet port 63 and outlet port 64 is designed to sample the turbulent mixture at different spatial locations in order to modify the powder mass flow concentration or the fluidizing and mixing conditions of projectile particles 2 injected into powder reactor 62.

Treatment device 66 may include one or more fluidizing ports 56 positioned in various locations along the walls of cavity 65. Each of the fluidizing ports 56 may include a sintered metal filter 58 for uniformly injecting said carrier gas 3, and for preventing backflow of the powder 49 into fluidizing ports 56. These fluidizing ports allow gases to be injected into cavity 65. These gases may be injected into fluidizing ports 56 at higher pressures than carrier gas 3 that is injected into inlet port 63. Treatment of powder 49 may include adding or mixing different types of gases through fluidizing ports 56 into cavity 65 to affect the properties of projectile particles 2 entrained in carrier gas 3. These gases include air, nitrogen, argon, helium, hydrogen, oxygen, steam, sulfur hexaflouride, or a combination of these gases. Inert or reactive gases may also be used to affect the properties of projectile particles 2 entrained in carrier gas 3. For example, to remove an oxide film from the surface of projectile particles 2, the gas treatment may consist of injecting hydrogen at an elevated temperature to react chemically with the oxide layer material. This reaction removes oxygen as a contamination from projectile particles 2.

Figure 10:
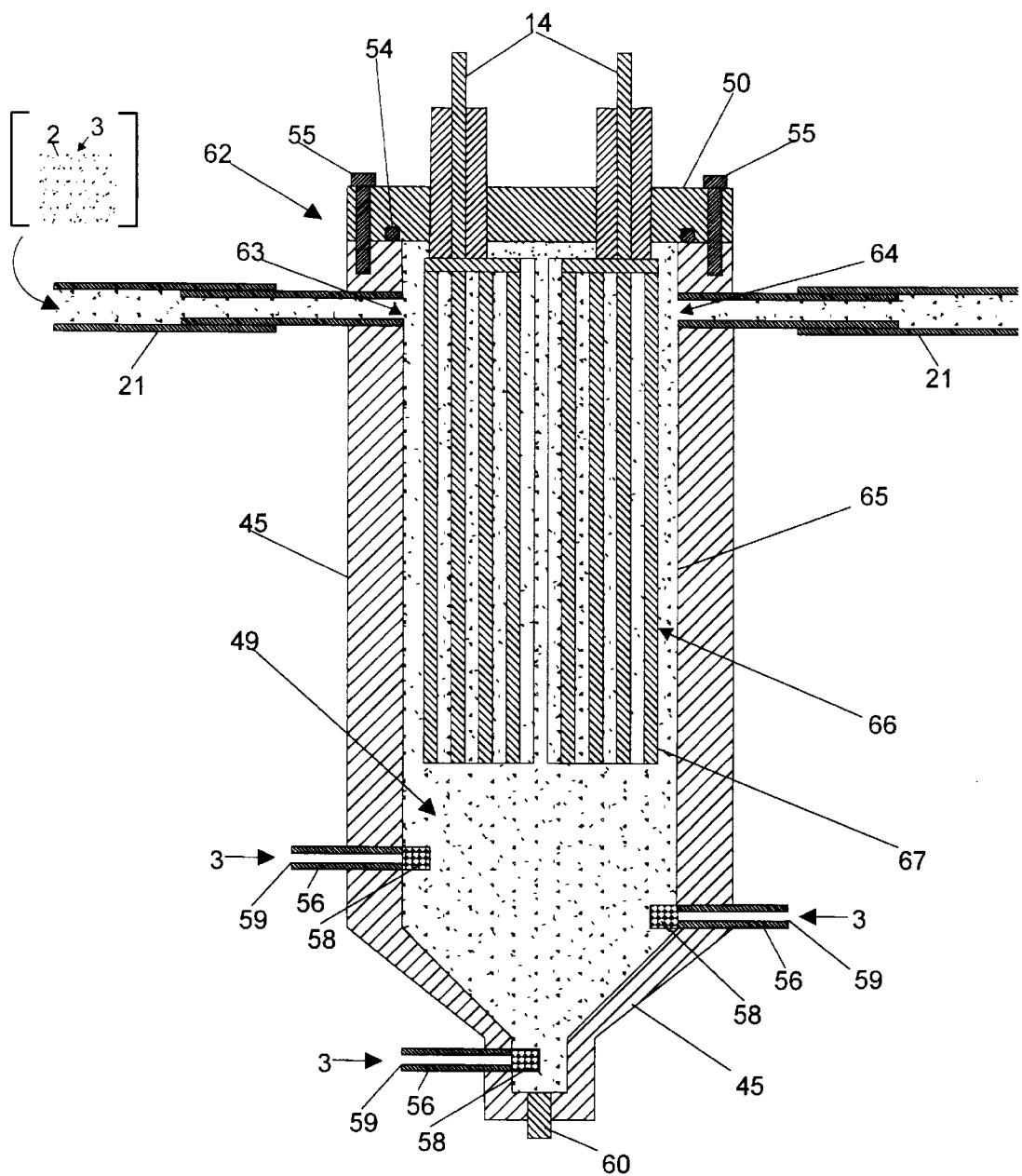
FIG. 10 shows a side sectional view of a powder reactor comprising an inner element configured as baffles for mixing and treating projectile particles entrained in a carrier gas.
Figure 11:
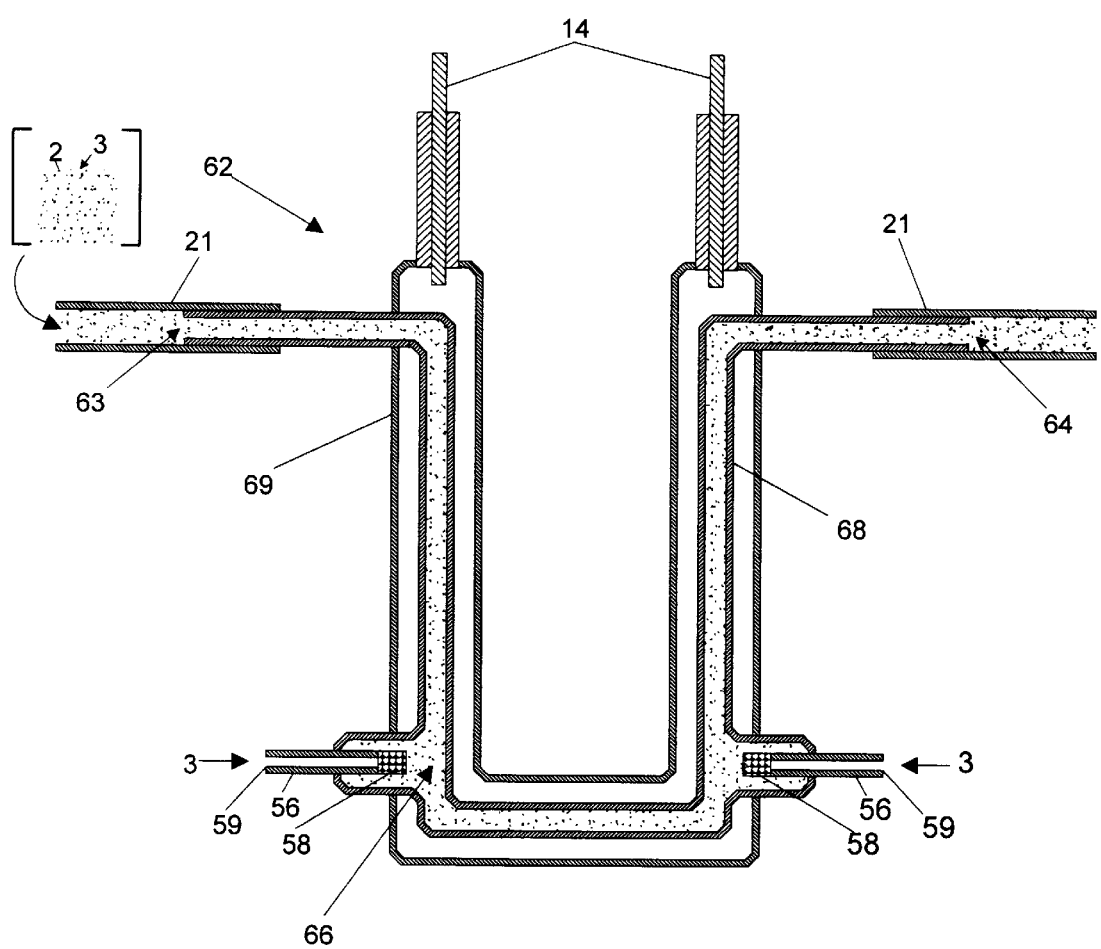
FIG. 11 shows a side sectional view of a powder reactor comprising an inner element configured as a tubular structure for mixing and treating projectile particles entrained in a carrier gas.

Treatment device 66 may be a set of baffles 67 positioned within cavity 65 for mixing and treating projectile particles 2 entrained in carrier gas 3. Baffles 67 may have different geometrical shapes designed to enhance the mixing and treatment feature of powder reactor 62. For example, FIG. 10 shows baffles 67 which are arranged as concentric hemi-cylindrical shells. Baffles 67 may be inert elements used strictly for the purpose of modifying mixing and mass flow concentrations of the projectile particles entrained in carrier gas 3. Baffles 67 may be also be electrically active for enhancing the triboelectric charging of projectile particles 2 prior to ejection into outlet port 64. In this case, baffles 67 are connected to a feedthrough electrode 14. Electrical power sources capable of delivering voltages up to the dielectric breakdown voltage of the carrier gas 3 with entrained projectile particles 2 may be used to enhance the triboelectric charging of projectile particles 2 through charge induction. This voltage may range anywhere from 50 to 50,000 volts.

Treatment device 66 may also be a sieve or filter positioned within cavity 65 for screening projectile particles 2 entrained in carrier gas 3. This design enables classification of projectile particles 3 into a specific particle size distribution prior to ejection into outlet 64. For example, a 325-mesh sieve may be installed in the form of a single element within cavity 65 to screen projectile particles 2 down to sizes below 45 microns before ejection into outlet port 64.

Treatment device 66 may also be an induction coil positioned within cavity 65 of powder reactor 62. The induction coil is connected via feedthrough electrodes 14 to a radio-frequency voltage source for inductively heating projectile particles 2 entrained in carrier gas 3 prior to ejection into outlet 64. This voltage source may be capable of delivering from 10 to 1,000 kW.

Treatment device 66 may also be sets of radiator panels that are heated by electrical resistive coils attach to the radiator panels and powered through electrodes 14. For example, treatment device 66 in the form of electrical resistive coils may be used to heat a mixture of carrier gas 3 and projectile particles 2 up to an elevated temperature while flowing through a cavity 65 having a cylindrical shape. This particular configuration requires up to 5 kW of electrical power to heat a nitrogen or helium carrier gas flowing at 10–25 lbm/h with entrained aluminum projectile particles at a concentration of 5% by weight. The helium carrier gas is regulated to a pressure of 200 psig.

The electrical resistive coils described above may be replaced by a coolant line interfaced into the cavity 65 in lieu of the electrodes 14 with a feedthrough coolant line that is used to flow a refrigerant liquid such as Freon through conventional coils attached to treatment device 66 configured as a radiator.

Powder reactor 62 may also be configured to permit the coating of projectile particles 2 entrained in carrier gas 3 with a second material prior to ejection into outlet port 64. Methods of coating include evaporation, physical vapor deposition, chemical vapor deposition, or sputtering of a second material via a resistive heater, an arc, a plasma, or laser ablation of the second material in the presence of the turbulent mixture consisting of projectile particles 2 entrained in carrier gas 3. Projectile particles 2 are coated by using a treatment device 66 with the appropriate physical or chemical apparatus for generating a vapor or molecular states of the second material to be deposited on the surface of projectile particles 2 entrained in carrier gas 3 during transit through powder reactor 62.

FIG. 11 shows an embodiment of powder reactor 62 that uses an elongated cavity design to implement the mixing and treatment features of powder reactor 62. Powder reactor 62 includes a tubular cavity 68, a treatment device 66, an inlet port 63, and an outlet port 64. This configuration is designed to convey projectile particles 2 entrained in carrier gas 3 through tubular cavity 68 while modifying the properties of projectile particles 2 through physical interactions, chemical reactions, or nuclear reactions. The length of tubular cavity 68 may be selected to permit the reactions to proceed to the desired extent during passage of projectile particles 2 entrained in carrier gas 3 through tubular cavity 68.

Treatment device 66 may include a heating or cooling device coupled to tubular cavity 68. Such a heating or cooling device may take the form of an outer jacket 69 positioned in a concentric fashion around tubular cavity 68. Outer jacket 69 includes electrodes 14 or coolant line feedthroughs which are capable of heating or cooling a thermally or electrically conductive media located in the space between the outer jacket 69 and tubular cavity 68.

This feature provides the means of heating or cooling projectile particles 2 entrained in carrier gas 3 by conduction, convection, and radiation of heat from the sidewalls of tubular cavity 68 prior to ejection through outlet port 64. Resistive heater coils may be connected to electrodes 14 and installed in a thermally conductive, but electrically insulating media between outer jacket 69 and tubular cavity 68. Alternatively, via conventional coolant line ffedthroughs in leiu of electrodes 14, liquids or gases (e.g., steam, oil, or freon refrigerant) may be circulated between outer jacket 69 and tubular cavity 68. Again, heating or cooling of projectile particles 2 entrained carrier gas 3 occurs by heat exchange (conduction, convection, and radiation) between the sidewalls of tubular cavity 68 and projectiles particles 2 entrained in carrier gas 3 prior to ejection through outlet port 64.

The heating or cooling treatment of projectile particles 2 entrained in carrier gas 3 is used to modify the physical properties of projectile particles 2. The heating or cooling treatment may also be used to promote chemical reactions between carrier gas 3 and projectile particles 2, thereby modifying the chemical properties of projectile particles 2. In addition, by cooling the mixture of projectile particles 2 entrained in carrier gas 3, the treatment process permits the removal of contamination products. For example, high temperature hydrogen may be used as a reducing agent to remove the oxide layer from projectile particles 2 and produce steam. This steam is removed from carrier gas 3 by cooling the gas and entrained projectile particles 2 below the condensation temperature for water vapor.

Treatment device 66 may also include one or more fluidizing ports 56 coupled to tubular cavity 68. Additional or different carrier gases 3 may be injected into these fluidizing ports 56 at higher pressures than carrier gas 3 that is injected into inlet port 63 of tubular cavity 68. Fluidizing ports 56 can also be used to repetitively exchange carrier gas 3 from one type of gas to another type of gas at various stages along the flow path of tubular cavity 68. Each of the fluidizing ports 56 may include a sintered metal filter 58 for uniformly injecting carrier gas 3 and for preventing back-flow of projectile particles 2 into fluidizing ports 56. Each of the fluidizing ports 56 is arranged along the walls of tubular cavity 68 at various stages required to implement the required physical or chemical reaction kinetics.

Powder reactor 62 with tubular cavity 68 can be configured to permit projectile particles 2 entrained in carrier gas 3 to be conveyed to a remote powder reactor such as a nuclear reactor. This permits projectile particles 2 entrained in carrier gas 3 to be activated by neutron reactions prior to ejection into outlet port 64. This process may be used to coat or spray-form radioactive materials.

A plurality of powder reactors 62 may be connected in series to achieve a desired sequence of processes. For example, one powder reactor 62 using tubular cavity 68 could be used as a hydride reactor feeding into a second powder reactor 62 with tubular cavity 68 that functions as a dehydride reactor. In this configuration, the first powder reactor 62 converts projectile particles 2 in the form of a metal into a metal hydride, while the second powder reactor 62 reverts projectile particles 2 in the form of a metal hydride back to an oxygen free metal. In addition, a plurality of powder reactors 62 connected in series may be used to repetitively heat and cool projectile particles 2 entrained in carrier gas 3. This process may be used to break down friable projectile particles 2 in the form of metal hydrides, such as titanium and uranium hydride, into projectile particles 2 with submicron and nanoscale dimensions In detail, the mixing and treatment feature of powder reactor 62 includes a chemical reactor for chemically modifying the chemical properties of projectile particles 2 entrained in carrier gas 3 prior to ejection into outlet port 64. In addition to reciprocally heating or cooling, each powder reactor 62 can be also be used to expose the projectile particles to different types of carrier gases 3.

For example, the spraying of oxygen-free titanium powder can be accomplished by first converting powder 49 in the form of titanium metal to titanium hydride by exposing projectile particles 2 to carrier gas 3 in the form of hydrogen at a temperature of approximately 750 K. At this temperature, the treatment also removes the metal oxide from the titanium projectile particles 2 by reacting the hydrogen carrier gas 3 with the oxide layer to produce steam. By reciprocally heating and cooling the titanium-hydride projectile particles 2 between 300 K and 750 K using hydrogen as carrier gas 3, this latter process can be used to break down friable projectile particles 2, such as titanium hydride, into finer or nanoscale projectile particles 2. A final stage powder reactor 62 may be used to inject an inert carrier gas 3 such as helium at a temperature in excess of 820 K. This process reverts the titanium hydride projectile particles 2 entrained in carrier gas 3 back to oxygen-free titanium metal prior to ejection into outlet port 64.

The chemical reaction kinetics determines the duration for the passage of projectile particles 2 through each of powder reactors 62 at a particular temperature and partial pressure of the gaseous reaction products. This determines the specific length of tubular cavity 68 required for implementing a particular treatment process within powder reactor 62. For example, powder reactor 62 may have tubular cavity 68 which has been designed with a tube approximately 50–100 feet in length and is heated with electrical resistive coils positioned in a thermally conductive media installed in the space between outer jacket 69 and tubular cavity 68. This particular design requires up to 50 kW of electrical power to heat hydrogen or helium carrier gas flowing at 25 lbm/h with entrained titanium projectile particles (concentration of 5% by weight) to a 700–1000 K temperature. The powder reactors 62 permts production of oxygen free titanium projectile particles (<45 microns diameter) through the hydride and dehydride process described above. Coating deposition and spray forming of the oxygen free titanium projectile particles was accomplished using the coating or ablation applicator described above with helium as the carrier gas and projectile particles in the form of titanium hydride.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding applications, are hereby incorporated by reference.

What is claimed is:

1. A mixing and conveying system adapted to create a mixture of projectile particles in carrier gas suitable for use in a supersonic applicator for conveying, accelerating, and triboelectrially charging projectile particles entrained in a supersonic carrier gas and adapted to convey the mixture to the supersonic applicator, said system comprising:

a) a hopper configured to contain a level of the projectile particles;

b) an inlet port open to the hopper above said level, the inlet port being configured to introduce a first gaseous stream into the hopper;

c) a mixer coupled to the hopper and configured to entrain the projectile particles in the carrier gas to create said mixture of projectile particles; and d) an outlet port coupled to the hopper above said level and configured to allow the mixture to exit from the hopper.

2. The mixing and conveying system of claim 1 wherein the mixing and conveying system further comprises said supersonic applicator, and said supersonic applicator comprises:

a) an inner nozzle configured to receive said mixture of projectile particles and carrier gas from the outlet port, said inner nozzle being configured to convey, triboelectrically charge, and accelerate projectile particles entrained in a supersonic carrier gas to speeds sufficiently high to apply a treatment from the group consisting of coating and ablation to a surface of a substrate when said substrate is impacted by a triboelectrically charged jet comprising a central core of said projectile particles in said carrier gas;

b) an outer evacuator nozzle surrounding said inner nozzle, said outer evacuator nozzle being configured to form a fluid dynamic coupling with said inner nozzle and the substrate to entrain and retrieve excess projectile particles and ablated substrate materials out through said evacuator nozzle;

c) said inner nozzle being configured to form a Mach turning angle between an exit of said inner nozzle and said substrate for aspiration of said central core when said carrier gas turns through said Mach turning angle; and d) wherein said fluid dynamic coupling aspirates said central core of said triboelectrically charged jet to gas pressures below a back-pressure of ambient gas pressure.

3. The mixing and conveying system of claim 1 wherein the system further comprises said supersonic applicator, and said supersonic applicator comprises:

a) an inner nozzle configured to receive said mixture from the outlet port, said inner nozzle being configured to convey, triboelectrically charge, and accelerate projectile particles entrained in supersonic carrier gas to speeds sufficiently high to apply a treatment from the group consisting of coating and ablation to a surface of a substrate when impacted by a triboelectrically charged jet comprising a central core of said projectile particles; and b) an outer evacuator nozzle surrounding said inner nozzle, said outer evacuator nozzle being configured to form a fluid dynamic coupling with said inner nozzle and the substrate to entrain and retrieve excess projectile particles and ablated substrate materials out through said evacuator nozzle.

4. The mixing and conveying system of claim 1 wherein the mixer comprises an agitator.

5. The mixing and conveying system of claim 4 wherein the agitator comprises an auger.

6. The mixing and conveying system of claim 4 wherein the agitator comprises a conveyor chain.

7. The mixing and conveying system of claim 1 wherein the mixer comprises at least one fluidizing port open to the hopper below said level and configured to introduce a second gaseous stream into the hopper to form said mixture.

8. The mixing and conveying system of claim 7 wherein the mixer comprises a plurality of fluidizing ports coupled to the hopper at different distances beneath said level.

9. The mixing and conveying system of claim 1 wherein the mixing and conveying system further comprises a treatment system configured to treat said mixture of projectile particles in carrier gas to modify a property of said mixture.

10. The mixing and conveying system of claim 9 wherein the treatment system comprises at least one fluidizing port coupled to the hopper below said level and configured to introduce a second gaseous stream comprising a treating gas into the hopper to treat said mixture.

11. The mixing and conveying system of claim 9 wherein the treatment system comprises a cavity having a cavity inlet port configured to receive said mixture from said hopper and wherein said cavity has a cavity outlet port adapted to convey said mixture to the supersonic applicator, said cavity inlet port and said cavity outlet port being configured and positioned on said cavity to provide a desired concentration of said projectile particles in said carrier gas.

12. The mixing and conveying system of claim 9 wherein the treatment system comprises a sieve positioned to receive said mixture of projectile particles and carrier gas and filter said mixture.

13. The mixing and conveying system of claim 9 wherein the treatment system comprises an outer jacket positioned in a surrounding relationship to a portion of said mixing and conveying system of claim 30 and configured to provide at least one selected from the group consisting of heating and/or cooling to said mixture of projectile particles and carrier gas.

14. The mixing and conveying system of claim 9 wherein at least a portion of said system is adapted to be treated with radiation to cause said mixture to become radioactive.

15. The mixing and conveying system of claim 9 wherein the mixing and conveying system further comprises said supersonic applicator, and said supersonic applicator comprises:

a) an inner nozzle configured to receive said mixture of projectile particles and carrier gas from the outlet port, said inner nozzle being configured to convey, triboelectrically charge, and accelerate projectile particles entrained in a supersonic carrier gas to speeds sufficiently high to apply a treatment from the group consisting of coating and ablation to a surface of a substrate when said substrate is impacted by a triboelectrically charged jet comprising a central core of said projectile particles in said carrier gas;

b) an outer evacuator nozzle surrounding said inner nozzle, said outer evacuator nozzle being configured to form a fluid dynamic coupling with said inner nozzle and the substrate to entrain and retrieve excess projectile particles and ablated substrate materials out through said evacuator nozzle;

c) said inner nozzle being configured to form a Mach turning angle between an exit of said inner nozzle and said substrate for aspiration of said central core when said carrier gas turns through said Mach turning angle; and d) wherein said fluid dynamic coupling aspirates said central core of said triboelectrically charged jet to gas pressures below a back-pressure of ambient gas pressure.

16. The mixing and conveying system of claim 9 wherein the system further comprises said supersonic applicator, and said supersonic applicator comprises:

a) an inner nozzle configured to receive said mixture from the outlet port, said inner nozzle being configured to convey, triboelectrically charge, and accelerate projectile particles entrained in a supersonic carrier gas to speeds sufficiently high to apply a treatment from the group consisting of coating and ablation to a surface of a substrate when impacted by a triboelectrically charged jet comprising a central core of said projectile particles; and b) an outer evacuator nozzle surrounding said inner nozzle, said outer evacuator nozzle being configured to form a fluid dynamic coupling with said inner nozzle and the substrate to entrain and retrieve excess projectile particles and ablated substrate materials out through said evacuator nozzle.

17. The mixing and conveying system of claim 9 wherein the treatment system comprises baffles configured to modify mixing of the projectile particles and the carrier gas.

18. The mixing and conveying system of claim 17 wherein the baffles are configured to receive electrical power from an electrical power source and triboelectrically charge the projectile particles.

19. The mixing and conveying system of claim 9 wherein the treatment system comprises a heater.

20. The mixing and conveying system of claim 19 wherein the heater comprises an induction coil.

21. The mixing and conveying system of claim 19 wherein the heater comprises a set of radiator panels positioned to cool said carrier gas with entrained projectile particles, said radiator panels being cooled by a set of cooling coils.

22. The mixing and conveying system of claim 19 wherein the heater comprises a set of radiator panels positioned to heat said carrier gas with entrained projectile particles, said radiator panels being heated by a set of electrical resistive coils.

23. The mixing and conveying system of claim 22 wherein the treatment system comprises a means of coating the projectile particles entrained in the carrier gas by evaporating material from said radiator panels.

* * * * *

UNITED STATES PATENT AND TRADEMARK OFFICE

CERTIFICATE OF CORRECTION

PATENT NO. : 6,074,135

DATED : June 13, 2000

INVENTOR(S) : Ralph M. TAPPHORN and Howard GABEL

It is certified that error appears in the above-identified patent and that said Letters Patent is hereby corrected as shown below:

Title page,
Under the [75] Inventors section, the address for the inventors should read as follows:

--Ralph M. Tapphorn, Goleta, Calif.; Howard Gabel, Santa Barbara, Calif.--

Under the [73] Assignee section, the Assignee's name is corrected as follows:

Please replace "Innovative Technologies, Inc." to read --Innovative Technology, Inc.--

In claim 13, column 25, line 53, replace "30" with --9--.

Signed and Sealed this

Twenty-second Day of May, 2001

*Attest:*

NICHOLAS P. GODICI

*Attesting Officer*     *Acting Director of the United States Patent and Trademark Office*